United States Patent
Sun et al.

(10) Patent No.: US 12,175,684 B2
(45) Date of Patent: Dec. 24, 2024

(54) PEDESTRIAN TRACKING METHOD, COMPUTING DEVICE, PEDESTRIAN TRACKING SYSTEM AND STORAGE MEDIUM

(71) Applicant: BOE TECHNOLOGY GROUP CO., LTD., Beijing (CN)

(72) Inventors: Yuhai Sun, Beijing (CN); Yu Gu, Beijing (CN); Wenchu Dong, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 374 days.

(21) Appl. No.: 17/455,331

(22) Filed: Nov. 17, 2021

(65) Prior Publication Data
US 2022/0180534 A1    Jun. 9, 2022

(51) Int. Cl.
G06T 7/246    (2017.01)
G06T 7/292    (2017.01)
(Continued)

(52) U.S. Cl.
CPC .............. *G06T 7/248* (2017.01); *G06T 7/292* (2017.01); *G06V 10/751* (2022.01);
(Continued)

(58) Field of Classification Search
None
See application file for complete search history.

(56) References Cited

U.S. PATENT DOCUMENTS 9,558,396 B2    1/2017 Feng et al.
2009/0180671 A1    7/2009 Lee et al.
(Continued)

FOREIGN PATENT DOCUMENTS

CN    106355603 A    1/2017
CN    108573230 A    9/2018
(Continued)

OTHER PUBLICATIONS

Jinguang et al., "Face recognition based on deep neural network and weighted fusion of face features", Journal of Computer Applications, vol. 36, No. 2, Feb. 10, 2016, pp. 437-443 {30 pages (23 pages of English Translation and 7 pages of Original Document)}.
(Continued)

*Primary Examiner* — Delomia L Gilliard
(74) *Attorney, Agent, or Firm* — WOMBLE BOND DICKINSON (US) LLP

(57) ABSTRACT

The present disclosure provides a pedestrian tracking method including: acquiring at least one piece of first video data and at least one piece of second video data; performing facial recognition on at least some first images of the first image frames to obtain tracking data of a first pedestrian including position information thereof at N moments; performing human body detection on at least some second images of the second image frames to obtain tracking data of a second pedestrian including a movement track thereof; determining tracking data of a target pedestrian when deviation between the position information of the first pedestrian at the N moments and the position information of the movement track of the second pedestrian at the same moments is within a preset range. The present disclosure also relates to a pedestrian tracking apparatus, a computing device, a pedestrian tracking system, and a computer-readable storage medium.

20 Claims, 6 Drawing Sheets

(51) Int. Cl.
*G06V 10/75* (2022.01)
*G06V 40/10* (2022.01)
*G06V 40/16* (2022.01)

(52) U.S. Cl.
CPC .......... *G06V 40/103* (2022.01); *G06V 40/161* (2022.01); *G06V 40/168* (2022.01); *G06V 40/172* (2022.01); *G06T 2207/10016* (2013.01); *G06T 2207/20084* (2013.01); *G06T 2207/30196* (2013.01)

(56) References Cited

U.S. PATENT DOCUMENTS

| | | | |
|---|---|---|---|
| 2019/0311181 A1 | 10/2019 | Chu et al. | |
| 2021/0032822 A1* | 2/2021 | Balogh | E01F 13/022 |
| 2022/0172377 A1* | 6/2022 | Gu | G06T 7/292 |

FOREIGN PATENT DOCUMENTS

| | | | | |
|---|---|---|---|---|
| CN | 109101915 A | 12/2018 | | |
| CN | 109344787 A | 2/2019 | | |
| CN | 109670451 A | 4/2019 | | |
| CN | 110427905 A | 11/2019 | | |
| CN | 111079600 A | 4/2020 | | |
| CN | 112926410 A | * | 6/2021 | |
| EP | 2624209 A1 | 8/2013 | | |
| JP | 5121999 B1 | 1/2013 | | |
| WO | 2017/084204 A1 | 5/2017 | | |
| WO | WO-2020042419 A1 | * | 3/2020 | ......... G06K 9/00348 |

OTHER PUBLICATIONS

Ming-Yong et al., "Fusing Appearance Statistical Features for Person Re-identification", Journal of Electronics & Information Technology, vol. 36, No. 8, Aug. 2014, pp. 1844-1851 {27 pages (19 pages of English Translation and 8 pages of Original Document)}.

Miyama et al., "Integrated Face Detection, Tracking, and Pose Estimation", 2012 IEEE 11th International Conference on Signal Processing, 2012, pp. 1056-1059.

Xiong et al., "Implementation of Face Tracking System with a Multirotor UAV", 2018 IEEE CSAA Guidance, Navigation and Control Conference (CGNCC), 2018, 5 pages.

* cited by examiner

PEDESTRIAN TRACKING METHOD, COMPUTING DEVICE, PEDESTRIAN TRACKING SYSTEM AND STORAGE MEDIUM

CROSS REFERENCE TO RELATED APPLICATIONS

The present application claims priority to Chinese patent application No. 202011407213.8 titled "Pedestrian Tracking Method, Pedestrian Tracking Apparatus and Pedestrian Tracking System" filed on Dec. 4, 2020, the entire content of which is incorporated by reference into the present disclosure.

TECHNICAL FIELD

The present disclosure relates to the field of image processing and in particular to a pedestrian tracking method, a pedestrian tracking apparatus, a computing device, a pedestrian tracking system, and a computer readable storage medium.

BACKGROUND

With the development of artificial intelligence, human body detection methods have been widely used in many fields such as security, video surveillance, and abnormal behavior analysis. Human body detection methods can detect one or more human bodies in the images captured by camera devices and mark the position of each human body to get the movement track of each human body.

However, at present, in the process of pedestrian tracking using human body detection methods, the problem of losing the tracking target might occur when the human body is partially obscured or the human pose changes greatly.

SUMMARY

A pedestrian tracking method, a pedestrian tracking apparatus, and a pedestrian tracking system are provided according to various exemplary embodiments of the present disclosure to reduce the probability of target loss when the human body detection method is used for pedestrian tracking by combining facial recognition with human body detection and pedestrian tracking.

Specifically, to achieve the above objectives, the following technical solutions are provided in accordance with various exemplary embodiments of the present disclosure.

According to a first aspect of the present disclosure, a pedestrian tracking method is provided. The method includes the following steps: acquiring at least one piece of first video data and at least one piece of second video data, wherein the first video data includes a plurality of frames of first image, and the second video data includes a plurality of frames of second image; performing facial recognition on at least some first images of the plurality of frames of first image to obtain tracking data of a first pedestrian, wherein the tracking data of the first pedestrian includes identity information of the first pedestrian and position information of the first pedestrian at N moments, and N is an integer greater than or equal to 1; performing human body detection on at least some second images of the plurality of frames of second image to obtain tracking data of a second pedestrian, wherein the tracking data of the second pedestrian includes a movement track of the second pedestrian, and the movement track of the second pedestrian includes position information of the second pedestrian at a plurality of moments; determining tracking data of a target pedestrian when deviation between the position information of the first pedestrian at the N moments and the position information of the movement track of the second pedestrian at the same moments is within a preset range, wherein the tracking data of the target pedestrian includes identity information of the target pedestrian and a movement track of the target pedestrian, and wherein the first pedestrian and the second pedestrian are both the target pedestrian, and the identity information of the target pedestrian is determined at least according to the identity information of the first pedestrian, and the movement track of the target pedestrian is determined at least according to the movement track of the second pedestrian.

In some exemplary embodiments, the step of performing facial recognition on at least some first images of the plurality of frames of first image to obtain tracking data of a first pedestrian includes: detecting whether each first image in the at least some first images includes a face of the first pedestrian; when the face of the first pedestrian is detected, acquiring facial feature information of the first pedestrian, and matching the facial feature information of the first pedestrian with facial feature information in a face database, wherein the face database includes a plurality of pieces of facial feature information and identity information of pedestrians respectively corresponding to the plurality of pieces of facial feature information; if successfully matched, using identity information of a pedestrian in the face database that matches the facial feature information of the first pedestrian as the identity information of the first pedestrian; if unsuccessfully matched, recording the facial feature information of the first pedestrian.

In some exemplary embodiments, the step of performing human body detection on at least some second images of the plurality of frames of second image to obtain tracking data of a second pedestrian includes: acquiring pedestrian frames in each second image of the at least some second images of the plurality of frames of second image, and obtaining the tracking data of the second pedestrian based on various pedestrian frames acquired, wherein a pedestrian frame is a frame shape marked according to a human body detected in each second image.

In some exemplary embodiments, the step of obtaining the tracking data of the second pedestrian based on various pedestrian frames acquired includes: processing image blocks corresponding to the various pedestrian frames by using a trained neural network model to obtain feature vectors of the image blocks corresponding to the various pedestrian frames; determining a pedestrian track of at least one pedestrian based on a feature vector of each of the various pedestrian frames, using the pedestrian track of the at least one pedestrian as the tracking data of the second pedestrian, wherein each of the at least one pedestrian corresponds to a pedestrian track.

In some exemplary embodiments, the step of determining tracking data of a target pedestrian when deviation between the position information of the first pedestrian at N moments and the position information of the movement track of the second pedestrian at the same moments is within a preset range includes: calculating a distance between a global coordinate of the first pedestrian and a global coordinate of the second pedestrian at each of the N moments, respectively, via the following equation $|A_iB_i| = \sqrt{(x1_i - x2_i)^2 + (y1_i - y2_i)^2}$, wherein, for each of the N moments, if the distance between the global coordinate $A_i$ of the first pedestrian and the global coordinate $B_i$ of the second pedestrian is less than or equal to a preset threshold, the first pedestrian and the second pedestrian are both determined as the target pedestrian, wherein, at an i-th moment, the global coordinate of the first pedestrian is $A_i$ ($x1_i$, $y1_i$) and the global coordinate of the second pedestrian is $B_i$ ($x2_i$, $y2_i$), $1 \leq i \leq N$; position information includes global coordinates, and the global coordinates are coordinates of pedestrians in a global coordinate system.

In some exemplary embodiments, the step that the movement track of the target pedestrian is determined at least according to the movement track of the second pedestrian includes: determining the movement track of the second pedestrian as the movement track of the target pedestrian; or generating the movement track of the target pedestrian based on the position information of the first pedestrian at the N moments and the movement track of the second pedestrian.

In some exemplary embodiments, the pedestrian tracking method further includes: receiving the first video data from a first camera device and receiving the second video data from a second camera device, wherein the first camera device is different from the second camera device; or receiving the first video data and the second video data from a third camera device.

In some exemplary embodiments, the pedestrian tracking method further includes: receiving a first access request configured to access the tracking data of the target pedestrian; outputting an access result displayed via a first interface, wherein the access result includes the identity information of the target pedestrian and the movement track of the target pedestrian.

In some exemplary embodiments, the pedestrian tracking method may further include: acquiring a distribution area of the target pedestrian and a dwell time of the target pedestrian in the distribution area, based on the movement track of the target pedestrian; and/or extracting an image of the target pedestrian from the at least some first images of the plurality of frames of first image; and/or extracting an image of the target pedestrian from the at least some second images of the plurality of frames of second image; wherein, when the pedestrian tracking method includes outputting an access result, the access result further includes at least one of: the image of the target pedestrian, the distribution area of the target pedestrian and the dwell time of the target pedestrian in the distribution area.

In some exemplary embodiments, the pedestrian tracking method may further include: receiving a second access instruction configured to access a statistical result; outputting the statistical result displayed via a second interface, the statistical result including at least one of: first data, second data, third data and fourth data; wherein the first data is a total number of target pedestrians in at least one distribution area at a current time; wherein the second data is a first number or a first ratio of the target pedestrians whose dwell time in the at least one distribution area is in different preset time intervals at the current time, the first ratio being a ratio of the first number to the total number of the target pedestrians; wherein the third data is a second number or a second ratio of the target pedestrians in each distribution area in a time period when the at least one distribution area includes a plurality of distribution areas, the second ratio being a ratio of the second number to the total number of the target pedestrians; wherein the fourth data is a total number of the target pedestrians in the at least one distribution area at different moments in a historical time period.

According to a second aspect of the present disclosure, a pedestrian tracking apparatus is provided. The pedestrian tracking apparatus includes an acquisition module and a processing module. The acquisition module is configured as acquiring at least one piece of first video data and at least one piece of second video data, wherein each piece of first video data includes a plurality of frames of first image, and each piece of second video data includes a plurality of frames of second image. The processing module is configured as: performing facial recognition on at least some first images of the plurality of frames of first image acquired by the acquisition module to obtain tracking data of a first pedestrian, wherein the tracking data of the first pedestrian includes identity information of the first pedestrian and position information of the first pedestrian at N moments, and N is an integer greater than or equal to 1. The processing module is further configured as: performing human body detection on at least some second images of the plurality of frames of second image acquired by the acquisition module to obtain tracking data of a second pedestrian, wherein the tracking data of the second pedestrian includes a movement track of the second pedestrian, and the movement track of the second pedestrian includes position information of the second pedestrian at a plurality of moments. The processing module is further configured as: determining tracking data of a target pedestrian when deviation between the position information of the first pedestrian at the N moments and the position information of the movement track of the second pedestrian at the same moments is within a preset range, wherein the tracking data of the target pedestrian includes identity information of the target pedestrian and a movement track of the target pedestrian, and wherein the first pedestrian and the second pedestrian are both the target pedestrian, and the identity information of the target pedestrian is determined at least according to the identity information of the first pedestrian, and the movement track of the target pedestrian is determined at least according to the movement track of the second pedestrian.

In some exemplary embodiments, the processing module is further configured as: detecting whether each first image in the at least some first images includes a face of the first pedestrian; when the face of the first pedestrian is detected, acquiring facial feature information of the first pedestrian, and matching the facial feature information of the first pedestrian with facial feature information in a face database, wherein the face database includes a plurality of pieces of facial feature information and identity information of pedestrians respectively corresponding to the plurality of pieces of facial feature information; if successfully matched, using identity information of a pedestrian in the face database that matches the facial feature information of the first pedestrian as the identity information of the first pedestrian; if unsuccessfully matched, recording the facial feature information of the first pedestrian.

In some exemplary embodiments, the processing module is further configured as: acquiring pedestrian frames in each second image of the at least some second images of the plurality of frames of second image, and obtaining the tracking data of the second pedestrian based on various pedestrian frames acquired, wherein a pedestrian frame is a frame shape marked according to a human body detected in each second image.

In some exemplary embodiments, the processing module is further configured as: processing image blocks corresponding to the various pedestrian frames by using a trained neural network model to obtain feature vectors of the image blocks corresponding to the various pedestrian frames; determining a pedestrian track of at least one pedestrian based on a feature vector of each of the various pedestrian frames, using the pedestrian track of the at least one pedestrian as the tracking data of the second pedestrian, wherein each of the at least one pedestrian corresponds to a pedestrian track.

In some exemplary embodiments, the processing module is further configured as: calculating a distance between a global coordinate of the first pedestrian and a global coordinate of the second pedestrian at each of the N moments, respectively, via the following equation $|A_iB_i|= \sqrt{(x1_i-x2_i)^2+(y1_i-y2_i)^2}$, wherein, for each of the N moments, if the distance between the global coordinate $A_i$ of the first pedestrian and the global coordinate $B_i$ of the second pedestrian is less than or equal to a preset threshold, the first pedestrian and the second pedestrian are both determined as the target pedestrian, wherein, at an i-th moment, the global coordinate of the first pedestrian is $A_i$ ($x1_i$, $y1_i$) and the global coordinate of the second pedestrian is $B_i$ ($x2_i$, $y2_i$), $1 \leq i \leq N$; position information comprises global coordinates, and the global coordinates are coordinates of pedestrians in a global coordinate system.

In some exemplary embodiments, the processing module is further configured as: determining the movement track of the second pedestrian as the movement track of the target pedestrian; or generating the movement track of the target pedestrian based on the position information of the first pedestrian at the N moments and the movement track of the second pedestrian.

In some exemplary embodiments, the pedestrian tracking apparatus further includes a receiving module, wherein: the receiving module is configured as receiving the first video data from a first camera device and receiving the second video data from a second camera device, wherein the first camera device is different from the second camera device; or the receiving module is configured as receiving the first video data and the second video data from a third camera device.

According to a third aspect of the present disclosure, a computing device is provided. The computing device includes a memory and a processor. The memory is configured to store computer instructions, and the processor is configured to run the computer instructions, wherein the computer instructions, when run by the processor, implement the pedestrian tracking method provided according to any of the above-mentioned exemplary embodiments.

According to a fourth aspect of the present disclosure, a pedestrian tracking system is provided. The pedestrian tracking system includes: a first camera device, a second camera device, a computing device, wherein the first camera device is configured to acquire at least one piece of first video data, the second camera device is configured to acquire at least one piece of second video data, the computing device includes a memory and a processor, the memory is configured to store computer instructions and the processor is configured to run the computer instructions, wherein the computer instructions, when run by the processor, implement the pedestrian tracking method provided according to any of the above-mentioned exemplary embodiments.

According to a fifth aspect of the present disclosure, a computer readable storage medium is provided. The computer readable storage medium is configured to store computer instructions, wherein the computer instructions, when run by a processor, implement the pedestrian tracking method provided according to any of the above-mentioned exemplary embodiments.

According to the pedestrian tracking method and apparatus provided according to the various exemplary embodiments of the present disclosure, the movement track of the second pedestrian is obtained by the human body detection method, and the identity information of the first pedestrian and the position information of the first pedestrian at the at least one moment are obtained by the facial recognition method. If at the at least one moment, the position of the first pedestrian is basically on the movement track of the second pedestrian, that is, the position of the first pedestrian does not deviate much from the movement track of the second pedestrian, the first pedestrian and the second pedestrian can be considered as the same pedestrian, that is, the target pedestrian. Therefore, the pedestrian tracking method and apparatus provided according to the various exemplary embodiments of the present disclosure can determine the movement track of the target pedestrian according to the movement track of the second pedestrian, and use the identity information of the first pedestrian as the identity information of the target pedestrian, to obtain the tracking data of the target pedestrian; that is, establishing the mapping relationship (also called the correspondence relationship) between the movement track of the target pedestrian and the identity information of the target pedestrian. When the human body is partially obscured and/or the human body posture changes greatly, and so on, in the prior art, the movement track of the second pedestrian before the occurrence of the above situations and the movement track of the second pedestrian after the occurrence of the above situations, which are obtained by the human body detection method, may be mistaken as the movement tracks of two second pedestrians, resulting in the loss of the target. However, in the present disclosure, since the mapping relationship between the movement track and the identity information of the target pedestrian is established, as long as the pedestrian's face is not completely obscured and the pedestrian's identity information can be recognized, it is possible to correspond the movement tracks of the two pedestrians before and after the occurrence of the above situation to the identity information of the same first pedestrian, thus being capable of reducing the probability of target tracking loss when pedestrian tracking is performed by using human body detection methods.

BRIEF DESCRIPTION OF DRAWINGS

In order to describe the technical solutions of the various exemplary embodiments of the present disclosure more clearly, the exemplary embodiments will be described in detail below with reference to the drawings. It should be understood that the drawings are only used to illustrate the principles of the technical solutions of the various exemplary embodiments of the present disclosure, and they do not constitute any limitation to the present disclosure. In the drawings.

Figure 1:
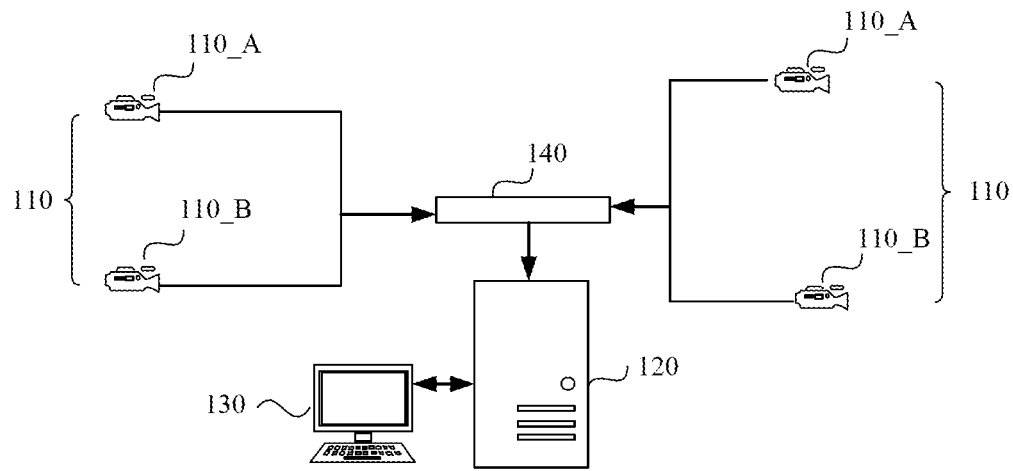
FIG. 1 is a schematic diagram of a system architecture provided according to some exemplary embodiments of the present disclosure.

It should be understood that the drawings of the present disclosure are all schematic, and therefore, they are not necessarily drawn to scale. In addition, throughout the drawings of the present disclosure, the same or similar features are denoted by the same or similar reference signs.

DETAILED DESCRIPTION OF EMBODIMENTS

The technical solutions of the various exemplary embodiments of the present disclosure will be clearly and completely described below in conjunction with the drawings. It should be understood that the described exemplary embodiments are only a part of the embodiments of the present disclosure, rather than all of the embodiments. Therefore, based on the exemplary embodiments described in the present disclosure, all other embodiments obtained by those having ordinary skills in the art without creative work fall within the scope of the present disclosure.

In the description of the present disclosure, it should be understood that the azimuth terms "center", "upper", "lower", "front", "rear", "left", "right", "vertical", "horizontal", "top", "bottom", "inner", "outer", and the like, indicate orientation or positional relationships based on those shown in the drawings and are intended only to facilitate the description of each exemplary embodiment of the present disclosure and to simplify the description, rather than indicating or implying that the device or element referred to must have a particular orientation, be constructed and operated in a particular orientation. Accordingly, these azimuth terms should not be construed as any limitations to the present disclosure.

Unless the context requires otherwise, the term "comprise" and its other forms such as the third person singular form "comprises" and the present participle form "comprising" are interpreted throughout the specification and claims to mean open, inclusive, i.e., "including, but not limited to". In the description of the specification, the terms "one embodiment", "some embodiments", "exemplary embodiments", "example", "specific example" or "some examples" are intended to indicate that a particular feature, structure, material, or characteristic associated with the embodiment or example is included in at least one embodiment or example of the present disclosure. The above-mentioned terms are not necessarily indicative of the same embodiment or example. In addition, the particular feature, structure, material or characteristic described may be included in any one or more embodiments or examples in any appropriate manners.

In the present disclosure, the phrase "at least one of A, B and C" has the same meaning as "at least one of A, B or C", and both of the two phrases include the following combinations of A, B and C: A only, B only, C only, a combination of A and B, a combination of A and C, a combination of B and C, and a combination of A, B and C.

In the present disclosure, the phrase "A and/or B" includes the following combinations of A, B and C: A only, B only, and a combination of A and B.

In the description of each exemplary embodiment of the present disclosure, the term "plurality" means two or more than two, unless otherwise specified.

In the present disclosure, the use of the term "suitable for" or "configured to" means an open and inclusive language, which does not exclude a device suitable for performing or configured to perform additional tasks or steps.

In addition, the use of the term "based on" means openness and inclusiveness, because processes, steps, calculations or other actions "based on" one or more of the described conditions or values may be based on additional conditions or exceed the described values in practice.

In addition, the terms "first", "second", "third" and the like are only used for descriptive purposes, and should not be construed as indicating or implying relative importance or implicitly indicating the number of indicated technical features. Therefore, a feature limited by the terms "first", "second" or "third" may explicitly or implicitly include one or more such features.

For example, in order to represent video data processed by different methods, the exemplary embodiments of the present disclosure add the terms "first" and "second" prior to the term "video data" to obtain "first video data" and "second video data". The video data used for facial recognition is referred to as the first video data, and the video data used for human body detection is referred to as the second video data. Similarly, in order to distinguish pedestrians appearing in different video data, the terms "first" and "second" are added prior to the term "pedestrian" to obtain "first pedestrian" and "second pedestrian. The pedestrian that appears in the first video data is referred to as the first pedestrian, and the pedestrian that appears in the second video data is referred to as the second pedestrian. Similarly, in order to distinguish the camera devices used to obtain the video data, the terms "first", "second" and "third" are added prior to the term "camera device" to obtain "first camera device", "second camera device" and "third camera device".

Unless otherwise defined, all terms (including both technical terms and scientific terms) used in the present disclosure have the same meaning as usually understood by one having ordinary skills in the art to which the present disclosure pertains. It should be further understood that terms such as those defined in a commonly used dictionary should be construed as having the same meanings as they do in the related art and/or in the context of this specification, and should not be construed in an ideal sense or an overly formal sense, unless explicitly defined so in the present disclosure.

It should be understood that the order of the steps in the method described in the present disclosure is only exemplary and not restrictive. Therefore, the steps of the method described in the present disclosure do not have to be performed in the described order, but may be performed in a different order according to actual needs, or may also include any appropriate additional steps. It should be understood that the logic and/or steps shown in the flowchart or described in other ways herein, for example, can be considered as a sequenced list of executable instructions for realizing logic functions, and can be implemented in any computer readable medium, for use in an instruction execution system, apparatus or device (such as a computer-based system, a system including a processor, or other systems that can fetch instructions from the instruction execution system, apparatus or device and execute the instructions), or in combination with these instruction execution system, apparatus or device.

It should be understood that each part of the present disclosure can be implemented by hardware, software, firmware, or a combination thereof. In the following exemplary embodiments, a plurality of steps or methods can be implemented by software or firmware stored in a memory and executed by a suitable instruction execution system. For example, if they are implemented by hardware, they can be implemented by any one of or a combination of the following technologies known in the art: discrete logic circuits with logic gate circuits for implementing logic functions on data signals, ASIC with suitable combinational logic gate circuits, Programmable Gate Array, Field Programmable Gate Array, and the like.

Exemplary embodiments of the present disclosure provide a pedestrian tracking method, which combines the identity information of a first pedestrian obtained by a facial recognition method with a movement track of a second pedestrian obtained by a human body detection method to establish the mapping relationship between the movement track of the at least one second pedestrian and the same identity information. At this time, the first pedestrian and the second pedestrian are the same pedestrian, which is referred to as the target pedestrian. Therefore, when the movement tracks of a plurality of second pedestrians are mapped to the same identity information, the movement tracks of the plurality of second pedestrians are associated and regarded as the movement track of the same pedestrian, thereby preventing target loss.

FIG. 1 schematically shows a system architecture, which can be used to implement a pedestrian tracking method according to an exemplary embodiment of the present disclosure. Referring to FIG. 1, the system architecture 100 includes: at least one (one or more) image acquisition device 110, a server 120 and a terminal 130. Among them, the image acquisition device 110 may be configured to collect video data; the server 120 is configured to process the video data to obtain the identity information and the movement track of the target pedestrian; the terminal 130 is configured to access the server 120 to acquire the identity information and the movement track of the target pedestrian, and can also display the identity information and the movement track of the target pedestrian.

The system architecture 100 may further include a routing apparatus 140, which can transmit the video data collected by the image acquisition device 110 to the server 120 by connecting the image acquisition device 110 and the server 120. The routing apparatus 140 may include a switch or a router, or the like, which is not limited in the present disclosure.

In this exemplary embodiment, at least one image acquisition device 110 may include: at least one image acquisition apparatus 110_A and at least one image acquisition apparatus 110_B; wherein the video data collected by the image acquisition apparatus 110_A is used for facial recognition and not for human body detection, and the video data collected by the image acquisition apparatus 110_B is used for human body detection and not for facial recognition. Of course, the video data collected by at least a part (part of or all) of the at least one image acquisition device 110 can be used for both facial recognition and human body detection. The first video data used for facial recognition and the second video data used for human body detection in this exemplary embodiment can be the same video data collected by the same image acquisition device 110, or can be video data collected by different image acquisition devices 110.

The present disclosure does not limit the types of the image acquisition apparatus 110_A and 110_B. As a non-limiting example, the image acquisition apparatus 110_A and 110_B may be a camera device, such as a web camera. Those skilled having ordinary skills in the art should understand that a web camera refers to a new generation of cameras produced by combining traditional cameras and network technologies. In addition to the image capture functions of a general traditional camera, the camera also has a built-in digital compression controller and a network-based operating system, so that the video data is compressed and encrypted, and then transmitted to other devices (such as terminals or servers) through a network (such as a local area network or a wireless network, or the like).

The present disclosure does not limit the type of terminal 130 as well. For example, the terminal may be a mobile phone, a desktop computer, a tablet computer, a notebook computer, a palmtop computer, a vehicle-mounted terminal, a wearable device, an ultra-mobile personal computer (UMPC), a netbook, or a personal digital assistant (PDA) and so on.

Figure 2:
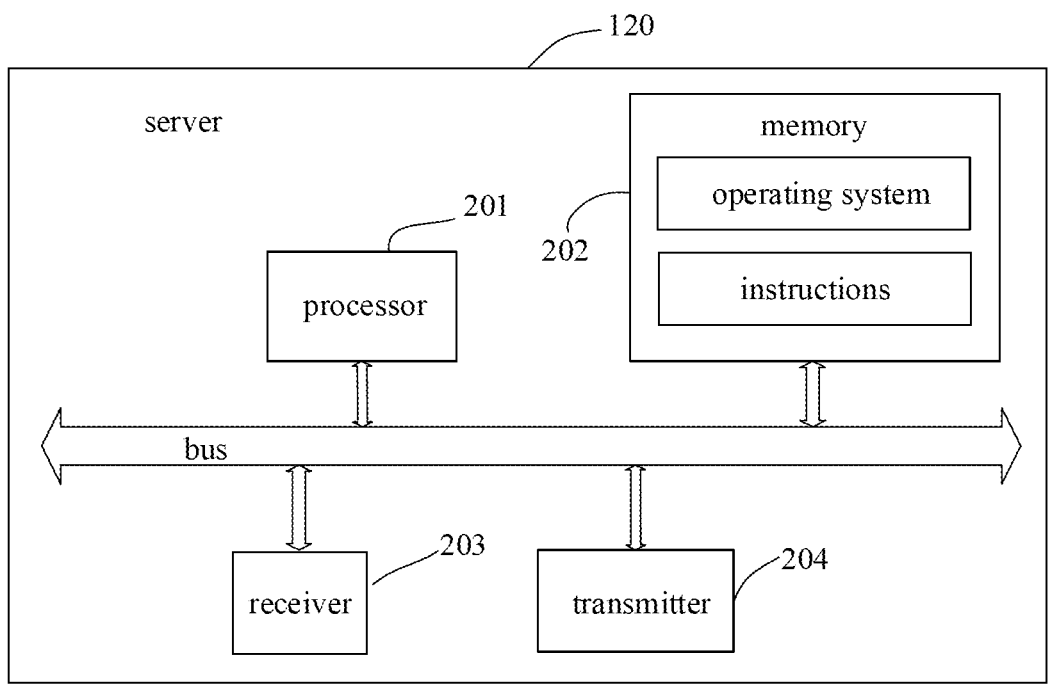
FIG. 2 is a schematic structural diagram of a server provided according to some exemplary embodiments of the present disclosure.

FIG. 2 is a schematic structural diagram of the server 120 shown in FIG. 1 provided according to an exemplary embodiment of the present disclosure. In some exemplary embodiments, the server 120 shown in FIG. 2 may include at least one processor 201 and a memory 202.

The processor 201 may be one or more general central processing units (CPUs), microprocessors, application-specific integrated circuits (ASICs), or integrated circuits for controlling program execution of some embodiments of the present disclosure. Among them, the CPU may be a single-core processor (single-CPU), or a multi-core processor (multi-CPU). A processor 201 here may refer to one or more devices, circuits, or processing cores for processing data (for example, computer program instructions).

The memory 202 can store an operating system and instructions (for example, computer instructions), which include but are not limited to random access memory (RAM), read only memory (ROM), erasable programmable read-only memory (EPROM), flash memory, or optical memory, or the like. The codes of the operating system are stored in the memory 202.

As a non-limiting example, the processor 201 can read and run the instructions stored in the memory 202 to enable the server 120 to implement the pedestrian tracking method in the following exemplary embodiment to obtain tracking data of the target pedestrian, or the processor 201 can run the internally stored instructions to enable the server 120 to implement the pedestrian tracking method in the following exemplary embodiment to obtain the tracking data of the target pedestrian. In the case that the processor 201 implements the method in the following exemplary embodiment by reading and running the instructions stored in the memory 202, the memory 202 stores the instructions for implementing the pedestrian tracking method provided by the exemplary embodiment.

In other exemplary embodiments, as shown in FIG. 2, the server 120 may further include a receiver 203 and a transmitter 204. It should be understood that in other exemplary embodiments, the server 120 may include a receiver 203 or a transmitter 204 according to actual needs.

The receiver 203 is configured to receive video data collected by at least one image acquisition device 110. For example, the receiver 203 can communicate with the routing apparatus 140 through a wired or wireless communication manner, and receive the video data sent through the routing apparatus 140.

The transmitter 204 can be connected with the terminal 130 in a wired or wireless communication manner, and is configured to send the tracking data of the target pedestrian (including: the identity information and the movement track of the target pedestrian that establishes the mapping relationship) to the terminal 130, and can also be configured to send the above-mentioned video data to the terminal 130 so that the terminal 130 can display the video data.

As shown in FIG. 2, at least one processor 201, memory 202, receiver 203, and transmitter 204 are communicatively connected to each other through a bus.

Figure 3:
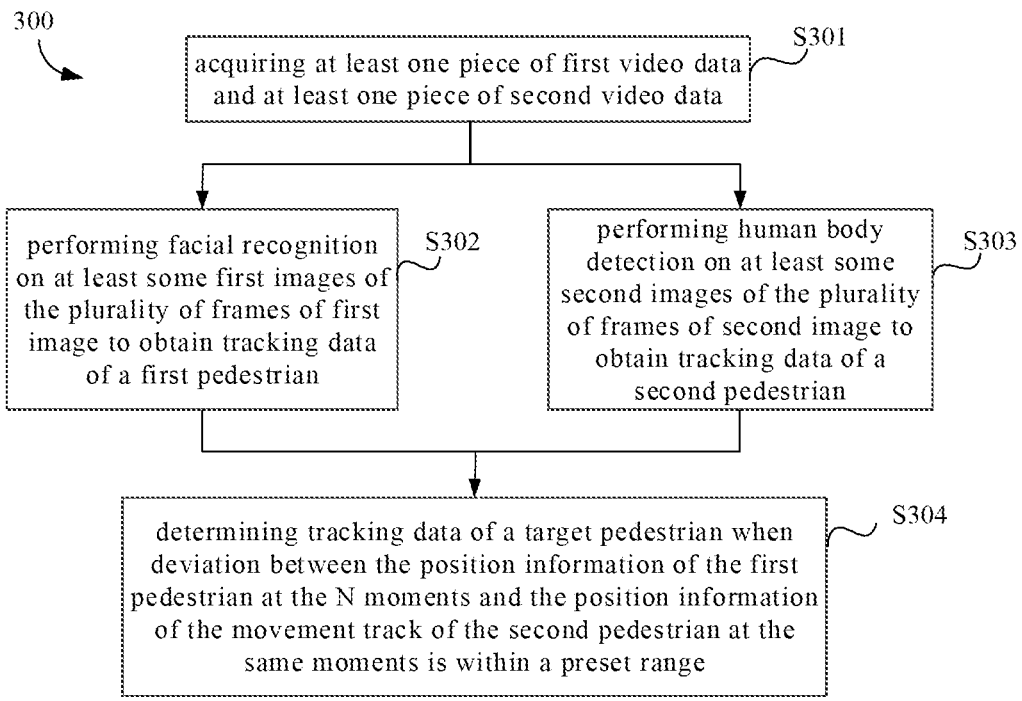
FIG. 3 is a schematic flowchart of a pedestrian tracking method provided according to some exemplary embodiments of the present disclosure.

As shown in FIG. 3, it is a schematic flowchart of a pedestrian tracking method provided according to some exemplary embodiments of the present disclosure. Based on the system architecture shown in FIG. 1, the exemplary embodiment shown in FIG. 3 provides a pedestrian tracking method 300. The execution subject of the method may be a server or some devices (such as a processor) in the server. The pedestrian tracking method 300 may include the following steps S301 to S304.

Step S301: acquiring at least one piece of first video data and at least one piece of second video data.

In this step, each piece of first video data can be collected by the image acquisition device 110, and includes a plurality of frames of first image. Each piece of second video data can be collected by the image acquisition device 110, and includes a plurality of frames of second image.

In some exemplary embodiments, at least one piece of first video data can be collected by at least one image acquisition apparatus 110_A, and sent to the server 120 through the routing apparatus 140. After the server 120 receives the first video data, the processor 201 included in the server 120 can process each piece of acquired first video data (for example, image extraction) to obtain a plurality of frames of first image contained in all the first video data. The at least one piece of second video data can be collected by at least one image acquisition apparatus 110_B, and sent to the server 120 through the routing apparatus 140. Similarly, the server 120 can obtain a plurality of frames of second image contained in at least one piece of second video data.

As a non-limiting example, in the case that the image acquisition apparatus is a camera device, the first video data may be received from the first camera device, and the second video data may be received from the second camera device, wherein the first camera device is different from the second camera device. That is, the first video data can be collected by the first camera device, and the second video data can be collected by the second camera device.

In other embodiments, at least one piece of first video data and at least one piece of second video data are collected by the same image acquisition apparatus. At this time, when the server 120 acquires at least one piece of first video data, it is equivalent to acquiring at least one piece of second video data, and there is no need to perform the step of acquiring the second video data again. Subsequently, the server 120 can process the acquired at least one piece of first video data to obtain a plurality of frames of first image, which is equivalent to obtaining a plurality of frames of second image.

As a non-limiting example, in the case that the image acquisition apparatus is a camera device, the first video data and the second video data may be received from a third camera device. In other words, the first video data and the second video data may be collected by the same third camera device.

As a non-limiting example, the plurality of frames of first image can be kept in only one copy in the server 120, for facial recognition in the subsequent step S302 and as a plurality of frames of second image for human body detection in the subsequent step S303.

As a non-limiting example, the plurality of frames of first image can be kept in only two copies in the server 120, one copy is used for facial recognition in the subsequent step S302, and the other is used as a plurality of frames of second image for human body detection in the subsequent step S303.

In still other exemplary embodiments, some pieces of video data in the at least one piece of first video data and the at least one piece of second video data are collected by the same image acquisition apparatus, and the other pieces of video data are collected by different image acquisition apparatus.

To summarize, in the present disclosure, the video data used for facial recognition in the subsequent step S302 is referred to as the first video data, and the video data used for human body detection in the subsequent step S303 is referred to as the second video data, both of which can be collected by the same, partly the same or completely different image acquisition apparatus.

Step S302: performing facial recognition on at least some first images of the plurality of frames of first image in the first video data to obtain tracking data of the first pedestrian.

In step 302, the tracking data of the first pedestrian includes: the identity information of the first pedestrian and the position information of the first pedestrian at N moments, wherein N is an integer greater than or equal to 1.

In this exemplary embodiment, the identity information of the first pedestrian may include at least one of the identity information such as the name, gender, age, and ID number of the first pedestrian, the position information of the first pedestrian may be the position coordinates of the first pedestrian. The position coordinates may be the coordinates of the pedestrian in the global coordinate system, optionally, the coordinates in the world coordinate system, or may be the coordinates relative to a coordinate system with a specific position as the coordinate origin, such as a specific position indoors or outdoors used as the coordinate origin. The position coordinates of the pedestrian are the coordinates relative to the specific position as the coordinate origin.

Those having ordinary skills in the art should understand that facial recognition is a method of identity recognition based on the facial feature information of a person.

Figure 4:
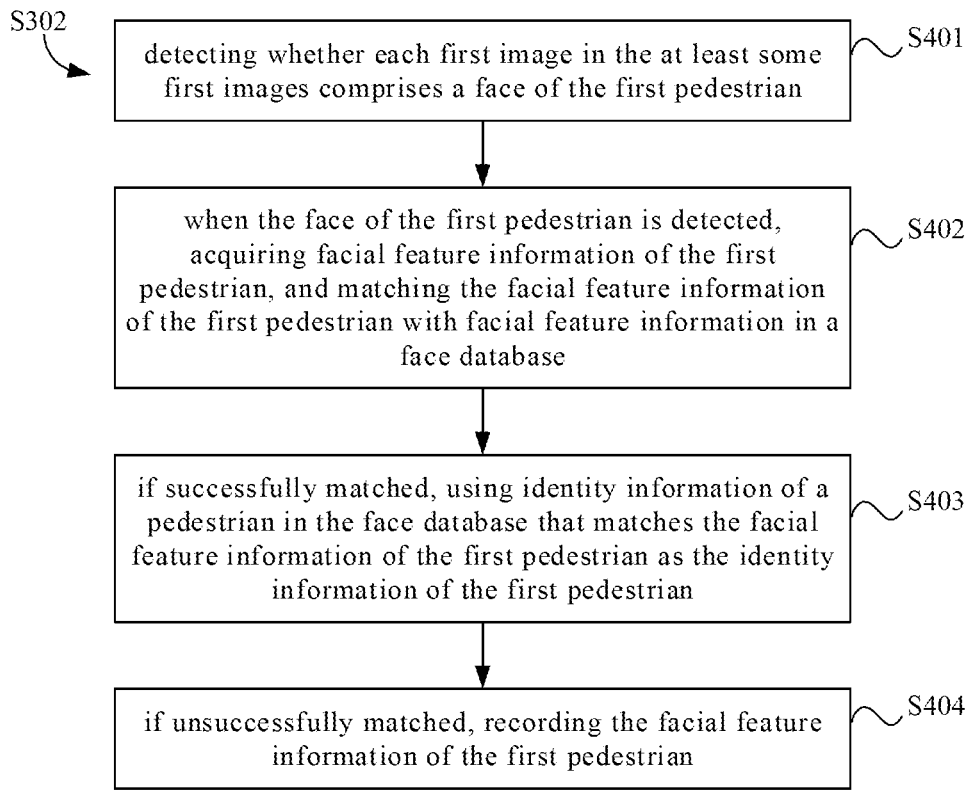
FIG. 4 illustrates the steps in the pedestrian tracking method shown in FIG. 3 in more detail in the form of a flowchart.

Referring to FIG. 4, it schematically shows how to implement step S302 in the pedestrian tracking method 300 shown in FIG. 3 in the form of a flowchart. As shown in FIG. 4, in some exemplary embodiments, the above-mentioned step S302 can be specifically implemented through the following steps S401 to S404.

Step S401: detecting whether each first image in the at least some first images includes a face of a pedestrian.

In some exemplary embodiments, an Single Shot Multi-Box Detector (SSD) algorithm can be used to detect whether an image (for example, the first image) includes a face of a pedestrian (for example, the first pedestrian).

Figure 5:
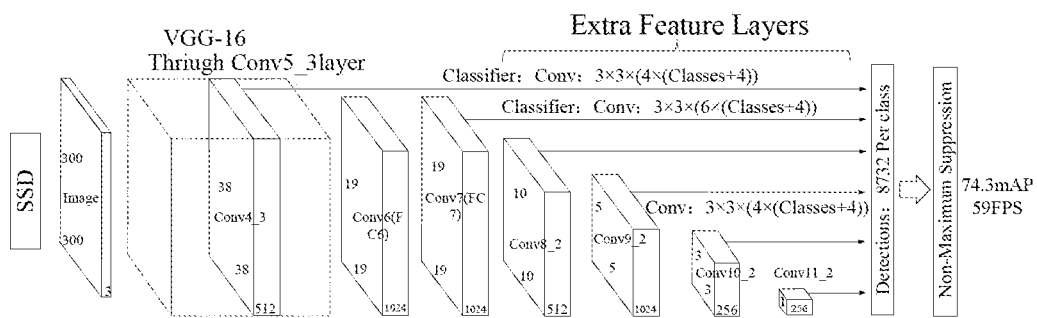
FIG. 5 is a schematic model block diagram of an SSD algorithm provided according to some exemplary embodiments of the present disclosure.

As shown in FIG. 5, it is a model block diagram used in facial detection using an SSD algorithm, wherein conv represents a convolutional layer, and priorbox represents a priori box. Those having ordinary skills in the art should understand that when using the SSD algorithm to detect whether an image has a human face, the image can be input first, and then the image is passed through a trained model, that is, the image is passed through a plurality of different convolutional layers in turn (for example, Conv6, Conv7 and other convolutional layers included in FIG. 5), and after the image is passed through the various convolutional layers, the feature maps are output respectively. Then, each feature map is input into the detection layer to output two sets of data, wherein one set of data is the probability of each category in the prediction box, and the other set of data is the position of the prediction box. In the model shown in FIG. 5, the detection layer includes two different 3*3 convolutional layers, which are respectively the confidence used for output classification and the localization used for output regression. In this way, the area frame of the face can be obtained.

It should be noted that since the SSD algorithm is an algorithm well known to those having ordinary skills in the art, the detailed explanation of this algorithm will not be repeatedly described in the present disclosure.

Step S402: when the face of the first pedestrian is detected, acquiring facial feature information of the first pedestrian, and matching the facial feature information of the first pedestrian with facial feature information in a face database.

The present disclosure does not limit the method of acquiring the facial feature information of the first pedestrian, for example, a neural network method may be used. In the present disclosure, when the neural network method is used to acquire facial feature information, the image f1 (which may be the entire first image, or may be the part of the first image that includes the face area), and then the image f1 is passed through a trained classification network (such as the ResNet network) to extract features in the face area, for example, the five senses included in the face area, and then generate the 1024-dimensional vector data of each feature based on the vector of attributes such as color and texture of each feature is generated, and then the angle cosine distance between the 1024-dimensional vector data of each feature generated and the 1024-dimensional vector data of each facial feature of an image f2 in a face database is calculated. Among them, the feature vector x of the image f1 is $x=(x_1, x_2, \ldots, x_i, \ldots, x_n)$, $x_i$ is the attribute vector of the image f1, and the feature vector y of the image f2 is $y=(y_1, y_2, \ldots, y_i, \ldots, y_n)$, $y_i$ is the attribute vector of the image f2, i is any integer greater than or equal to 1, and less than or equal to n, n is the dimension of vector data, and for 1024-dimensional vector data, n takes a value of 1024. The angle cosine distance can be used as the similarity score (also referred to as cosine similarity) between the image f1 and the image f2. If the similarity score is greater than or equal to a threshold of the similarity score, it can be considered that the face in the image f1 and the face in the image f2 of the face database are the same; correspondingly, if the similarity score is less than the threshold of the similarity score, it can be considered that the face in the image f1 is not the same as the face in the image f2 of the face database.

Therefore, for the image f1 and the image 12, the equation for calculating the angle cosine distance is $$\cos(x, y) = \frac{\sum_{i=1}^{n} x_i y_i}{\sqrt{\sum_{i=1}^{n}(x_i)^2} * \sqrt{\sum_{i=1}^{n}(y_i)^2}}.$$

Specifically, in the above-mentioned angle cosine distance equation, $x_i$ represents the attribute vector of the image f1, and $y_i$ represents the attribute vector of the image f2.

It should be noted that ResNet (Residual Neural Network) is well known to those having ordinary skills in the art. Therefore, the detailed explanation of the network will not be repeatedly described in the present disclosure.

In addition, the present disclosure does not limit the threshold of the similarity score. Those having ordinary skills in the art can determine the threshold of the similarity score according to actual needs. For example, the threshold of the similarity score may be 0.6 or 0.7.

In some exemplary embodiments, the facial features may be, for example, the five senses of the face, and the facial feature information may be information such as the color and texture of the five senses of the face. The face database contains the facial feature information and the identity information of the pedestrian corresponding to the facial feature information. The server matches the acquired facial feature information of the first pedestrian with each piece of facial feature information stored in the face database in turn.

If successfully matched, that is, the facial feature information in the face database and the facial feature information of the first pedestrian belong to the same pedestrian, step S403 can be performed. If unsuccessfully matched, that is, there is no facial feature information in the face database that belongs to the same pedestrian as the facial feature information of the first pedestrian, then step S404 can be performed.

Step S403: if successfully matched, using the identity information of the pedestrian in the face database that matches the facial feature information of the first pedestrian as the identity information of the first pedestrian.

The facial feature information of a plurality faces can be stored in the face database, for example, they can be represented by Face1, Face2, . . . , and the like; and the identity information corresponding to them, for example, they can be represented by ID1, ID2, . . . , and the like. Assuming that the facial feature information of the first pedestrian belongs to the same pedestrian as Face2, the ID2 corresponding to Face2 is used as the identity information of the first pedestrian.

Step S404: if unsuccessfully matched, recording the facial feature information of the first pedestrian.

At this time, the server may send an indication that the match fails, for example, it may send an indication message indicating that the match has failed to the terminal. In addition, after the face database is updated, the recorded facial feature information of the first pedestrian can be matched with the facial feature information in the updated face database. If successful matched, a successful match indication can be sent.

Based on the above steps S401 to S404, in some examples, assuming that there are 10 frames of first image for facial recognition in the at least one piece of video data, the server can sequentially detect whether there is a face of a first pedestrian in the 10 frames of first image. If the face of the first pedestrian is detected in the first frame of first image, the server will perform the above steps S402 to S404; if no face is detected in the first frame of first image, then the second frame of first image will be detected. If there is the face of the first pedestrian in the second frame of first image, the above steps S402 to S404 will be performed, and if not, the third frame of first image will be detected, and so on.

In addition, in the case that the face of the first pedestrian is detected in one frame of first image in the above step S401, the position information of the first pedestrian may be determined. The position information of the first pedestrian may be coordinates in the first image, or coordinates in a global coordinate system, that is, global coordinates. After detecting the face of the first pedestrian, according to the coordinates of the face of the first pedestrian in the first image, the coordinates of the first pedestrian in the global coordinate system can be obtained through coordinate conversion, that is, the global coordinates. When the face of the first pedestrian is detected, the frame shape corresponding to the face can be obtained on the first image, and the coordinates of a certain point of the frame shape are calculated as the coordinates of the first pedestrian in the first image, such as end point or midpoint, or the like. Since each image corresponds to a specific area in the real world, and each position in the image corresponds to a position in the real world, when the global coordinate system is established, each position in the image corresponds to one coordinate in the global coordinate system. Therefore, the coordinates in the global coordinate system can be obtained according to the coordinates of the object in the image. For example, the coordinates of the first pedestrian in the global coordinate system can be determined from the coordinates in the global coordinate system and in the image of one or more reference points (for example, the upper left and upper right corners of the image) in the frame of the image captured by the image acquisition apparatus corresponding to that frame of image, and the position of that first pedestrian in that frame of image. Among them, the position of the reference point in a frame of image captured by the image acquisition apparatus can be obtained from the position of the image acquisition apparatus, the mounting height, the shooting angle, and the shooting resolution, and the like. This embodiment does not limit the method for determining the position information of the first pedestrian.

Referring to FIG. 3 continuously, in the S303, performing human body detection on at least some second images of the plurality of frames of second image in the second video data to obtain tracking data of a second pedestrian.

In step S303, the tracking data of the second pedestrian includes the movement track of the second pedestrian, the movement track of the second pedestrian includes position information at a plurality of moments, and that is, the position information of the second pedestrian at the plurality of moments forms the movement track of the second pedestrian.

In the present disclosure, the human body detection refers to a technology that can distinguish different pedestrians and return position information of each pedestrian.

Figure 6:
FIG. 6 illustrates the steps in the pedestrian tracking method shown in FIG. 3 in more detail.

Referring to FIG. 6, it schematically illustrates how to implement step S303 in the pedestrian tracking method 300 shown in FIG. 3. As shown in FIG. 6, in some exemplary embodiments, the above-mentioned step S303 can be specifically implemented by the following step S3031.

Step S3031: acquiring pedestrian frames in the at least some second images of the plurality of frames of second image in the second video data, and obtaining the tracking data of the second pedestrian based on various pedestrian frames acquired.

In step S3031, the pedestrian frame may be a frame shape marked according to the detected human body in each second image. As a non-limiting example, the pedestrian frame may be a rectangular frame drawn according to the outline of the pedestrian, and therefore may also be referred to as a pedestrian rectangular frame. Among them, the position of the pedestrian can be determined by the midpoint of the lower side of the rectangular frame. For example, in the direction perpendicular to the horizontal plane, the two long sides of the rectangle can be drawn according to the positions of the pedestrian's left side (for example, the left arm) and the pedestrian's right side (for example, the right arm). In the direction parallel to the horizontal plane, the two short sides of the rectangle can be drawn according to the positions of the pedestrian' top (for example, the top of the head) and bottom (for example, where the pedestrian's feet are). In this way, a rectangular frame can be drawn according to the outline of the pedestrian, and the position of the pedestrian can be determined according to the midpoint of the lower side of the rectangular frame.

In the present disclosure, an SSD algorithm, a yolo (You Only Look Once) algorithm, or a faster renn algorithm may be used to acquire the pedestrian frame in the second image. Since these algorithms are well-known to those having ordinary skills in the art, they will not be repeatedly described in the present disclosure.

In the case that the human body of the second pedestrian is detected in a frame of second image in the above-mentioned step S3031, the position information of the second pedestrian can be determined. The position information of the second pedestrian may be coordinates in the second image, or coordinates in a global coordinate system, that is, global coordinates. The calculation method of the global coordinates of the second pedestrian is similar to the calculation method of the global coordinates of the first pedestrian described above. When the second pedestrian is detected, the frame shape corresponding to the human body can be obtained in the second image. Optionally, the coordinates of a certain point of the frame shape can be calculated as the coordinates of the second pedestrian in the second image, such as the end point or the midpoint, or the like; optionally, the position of the feet of the pedestrian is recognized through the image as the coordinates of the second pedestrian in the second image. Then, according to the coordinates of the object in the image, its coordinates in the global coordinate system can be obtained. For example, the coordinates of the second pedestrian in the global coordinate system can be determined from the coordinates in the global coordinate system and in the image of one or more reference points (for example, the upper left and upper right corners of the image) in the frame of the image captured by the image acquisition apparatus corresponding to that frame of image, and the position of that second pedestrian in that frame of image.

In some exemplary embodiments, obtaining the tracking data of the second pedestrian based on the various pedestrian frames acquired in step S3031 can be specifically implemented through the following two steps (that is, the following steps 1 and 2).

Step 1: processing image blocks corresponding to the various pedestrian frames by using a trained neural network model to obtain feature vectors of the image blocks corresponding to the various pedestrian frames.

The present disclosure does not limit the neural network model used. For example, the above-mentioned neural network model may be a convolutional neural network model or a deep neural network model.

Those having ordinary skills in the art should understand that convolutional neural network (CNN) is a deep feed-forward artificial neural network, artificial neurons of which can respond to surrounding units within a part of the coverage area. CNN has excellent performance for large-scale image processing, and has been applied in the field of image recognition.

In some exemplary embodiments, a convolutional neural network can be trained, and the trained convolutional neural network can be used to process the image block contained in the pedestrian frame to output the feature vector of the pedestrian frame, and the feature vector is transmitted to the server, so that the server obtains the feature vector of the pedestrian frame. For example, a visual geometry group (VGG) 16 network or a ResNet50 network can be used for processing to output a 2048-dimensional feature vector of each pedestrian frame.

It should be noted that the VGG and ResNet50 networks are the technologies well-known to those having ordinary skills in the art, and therefore the detailed explanation of these two networks will not be repeatedly described in the present disclosure.

In some exemplary embodiments, in the process of training the convolutional neural network, the current internationally published data sets (mainly indoor situations) can be used first, and based on an existing data model, new training samples can be used to train the data model to obtain a new data model. Among them, the feature vector output by the trained convolutional neural network can be used to distinguish whether two pedestrian frames belong to the same pedestrian.

Step 2: determining a pedestrian track of at least one pedestrian based on a feature vector of each of the various pedestrian frames, using the pedestrian track of the at least one pedestrian as the tracking data of the second pedestrian, wherein each of the at least one pedestrian corresponds to a pedestrian track.

Figure 7:
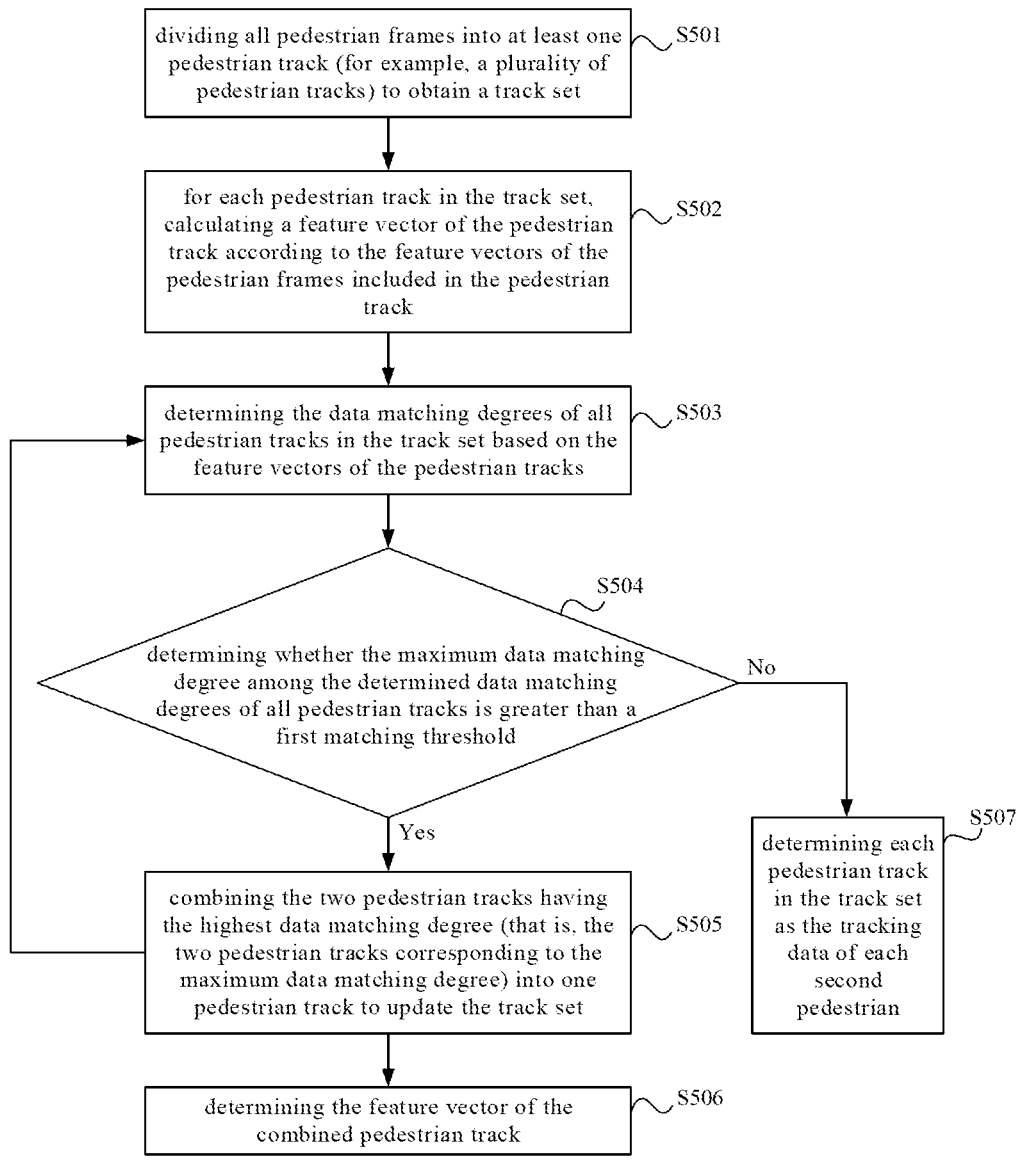
FIG. 7 illustrates the steps shown in FIG. 6 in more detail in the form of a flowchart.

Referring to FIG. 7, it further illustrates step S3031 in detail. As shown in FIG. 7, in some exemplary embodiments, the above-mentioned step 2 can be specifically implemented through the following steps S501 to S507.

Step S501: dividing all pedestrian frames into at least one pedestrian track (for example, a plurality of pedestrian tracks) to obtain a track set.

Specifically, pedestrian matching can be performed on all pedestrian frames, and pedestrian frames belonging to the same pedestrian are divided into the same pedestrian track. In some exemplary embodiments, pedestrian matching may be to perform similarity score matching on the feature vectors of any two different pedestrian frames. When the similarity score is greater than a first threshold, it can be considered that the pedestrian frame matching is successful, and the two different pedestrian frames belong to the same pedestrian. When performing similarity matching, the above-mentioned calculation equation of the angle cosine distance can be used, and the calculated angle cosine distance can be used as the similarity score between the feature vectors of two different pedestrian frames. It should be noted that this embodiment does not limit the value of the first threshold. For example, the first threshold may be 0.6 or 0.7.

In some other exemplary embodiments, the process of pedestrian matching may refer to a pedestrian re-identification (Person re-ID) algorithm. The pedestrian re-identification algorithm can predict the position and pose of the pedestrian in the next frame of image based on the position and pose of the pedestrian in the previous frame of image (the position and pose of the pedestrian can be represented by the feature vector of the pedestrian frame). If the position and pose of the pedestrian detected in the next frame are consistent with the predicted result or the similarity is greater than or equal to a second threshold, it can be confirmed that the pedestrians in the two frames of image are the same person (that is, the pedestrian frame matching is successful). If not consistent, it can be confirmed that the two are not the same person. Among them, the previous frame of image and the next frame of image are two adjacent frames of image. For example, assuming that a total of thirty pedestrian frames are detected in ten second images, the thirty pedestrian frames can be divided into ten pedestrian tracks through pedestrian matching in step S501, and the ten pedestrian tracks form a track set.

As a non-limiting example, if a total of thirty pedestrian frames are detected in the ten second images, then the thirty pedestrian frames can be directly divided into thirty pedestrian tracks, that is, each pedestrian track contains only one pedestrian frame, and the thirty pedestrian tracks form a track set.

It is understandable that if all pedestrian frames are divided into the same pedestrian track through pedestrian matching in the above step S501, the subsequent steps may not be performed, and the obtained pedestrian track is the desired pedestrian movement track.

Step S502: for each pedestrian track in the track set, calculating a feature vector of the pedestrian track according to the feature vectors of the pedestrian frames included in the pedestrian track.

In some exemplary embodiments, for each pedestrian track in the track set, a weighted average or arithmetic average may be performed on the feature vectors of the pedestrian frames included in the pedestrian track to obtain the feature vector of the pedestrian track. Among them, in the case of performing a weighted average, the weight can be set as required, which is not limited in the present disclosure. For example, assuming that a pedestrian track includes ten pedestrian frames, the feature vectors of the ten pedestrian frames can be weighted and averaged, and the average result is used as the feature vector of the pedestrian track.

Step S503: determining the data matching degrees of all pedestrian tracks in the track set based on the feature vectors of the pedestrian tracks.

In step S503, the above-mentioned data matching degree is obtained by combining the movement matching degree and the appearance feature matching degree.

In some exemplary embodiments, the pedestrian tracks in the track set are compared in pairs to obtain the movement matching degree and the appearance feature matching degree between the two pedestrian tracks.

Among them, the movement matching degree is characterized by the Mahalanobis distance. The greater the Mahalanobis distance, the greater the movement matching degree between the two pedestrian tracks. The equation for calculating a Mahalanobis distance is $D_M(x)=\sqrt{(x-\mu)^T \Sigma^{-1}(x-\mu)}$, wherein, $\Sigma$ is the covariance matrix of multi-dimensional random variables, and $\mu$ is the sample mean.

The appearance feature matching degree is characterized by the angle cosine distance between the feature vectors. The greater the angle cosine distance, the greater the appearance matching degree between two pedestrian tracks. Among them, the equation of the angle cosine distance may refer to the equation of the angle cosine distance described in the above-mentioned embodiment, and will not be repeatedly described here.

In other exemplary embodiments, the data matching degree can also be expressed in terms of the Euclidean distance between two pedestrian tracks. The greater the Euclidean distance, the lower the data matching degree; correspondingly, the smaller the Euclidean distance, the higher the data matching degree. Among them, the calculation equation of Euclidean distance is $d_x = \sqrt{\sum_{i=1}^{n}(x_i-y_i)^2}$, wherein, $x_i$ and $y_i$ both represent feature vectors.

Step S504: determining whether the maximum data matching degree among the determined data matching degrees of all pedestrian tracks is greater than a first matching threshold; if yes, go to step S505, if not, go to step S507.

It should be noted that the first matching threshold may be set as required, and this embodiment does not limit this. For example, the first matching threshold may be 60% or 70%.

Step S505: combining the two pedestrian tracks having the highest data matching degree (that is, the two pedestrian tracks corresponding to the maximum data matching degree) into one pedestrian track to update the track set.

That is, the pedestrian tracks belonging to the same pedestrian are combined into one pedestrian track.

For example, in the case that the pedestrian track set at different moments acquired through step S501 includes ten pedestrian tracks, the two pedestrian tracks having the highest data matching degree may be combined into one pedestrian track to update the track set.

Step S506: determining the feature vector of the combined pedestrian track, and returning to step S503. Here, the method in step S502 can be used to calculate the feature vector of the combined pedestrian track.

Step S507: determining each pedestrian track in the track set as the tracking data of each second pedestrian.

As a non-limiting example, assuming that the track set obtained in step S501 includes three pedestrian tracks: track 1, track 2 and track 3, the data matching degree between track 1 and track 2 is 90%, the data matching degree between track 2 and track 3 is 80%, and the data matching degree between track 1 and track 3 is 50%. Among them, the maximum data matching degree is the data matching degree between track 1 and track 2, that is, 90%. Assuming that the first matching threshold is 75%, the maximum data matching degree of 90% meets the requirement of greater than the first matching threshold of 75%, and track 1 and track 2 can be combined into one pedestrian track. The combined track is referred to as track 4. At this time, only track 3 and track 4 are included in the track set. Subsequently, the feature vector of the combined track 4 is determined. Returning to S503, based on the determined feature vector of the track 4, the data matching degree between the track 3 and the track 4 is determined, in order to determine whether the two tracks can be combined. If the two tracks can be combined, the combined track is referred to as track 5. At this time, only track 5 is included in the track set. Therefore, at this time, track 5 is the tracking data of the second pedestrian. Specifically, the track 5 is the movement track of one second pedestrian. If the two tracks cannot be combined, track 3 and track 4 are the movement tracks of two different second pedestrians.

It should be noted that the steps S503 to S506 can be continuously performed in a loop until the maximum data matching degree is less than or equal to the first matching threshold.

Continuing to refer to FIG. 3, in step S304, determining tracking data of a target pedestrian when deviation between the position information of the first pedestrian at the N moments and the position information of the movement track of the second pedestrian at the same moments is within a preset range.

In step S304, the above-mentioned position information includes global coordinates, which are the coordinates of the pedestrian in the global coordinate system; the above-mentioned tracking data of the target pedestrian includes: the identity information of the target pedestrian and the movement track of the target pedestrian, wherein the first pedestrian and the second pedestrian are the target pedestrian, the identity information of the target pedestrian is determined at least according to the identity information of the first pedestrian, and the movement track of the target pedestrian is determined at least according to the movement track of the second pedestrian.

It should be noted that the preset range in this exemplary embodiment can be set as required, and the present disclosure does not limit this In some exemplary embodiments, the distance between the global coordinate of the first pedestrian and the global coordinate of the second pedestrian may be calculated respectively at each of the N moments by the following equation $|A_i B_i| = \sqrt{(x1_i - x2_i)^2 + (y1_i - y2_i)^2}$, $1 \leq i \leq N$. Specifically, for each of the N moments, if the distance between the global coordinate $A_i$ of the first pedestrian and the global coordinate $B_i$ of the second pedestrian is less than or equal to the preset threshold, the first pedestrian and the second pedestrian can be determined as the target pedestrian.

As a non-limiting example, when N is greater than or equal to 2, that is, at two moments, for example, at the first moment, the facial recognition technology can be used to determine the position information of the first pedestrian at the first moment, and the human body detection technology can be used to determine the movement track of the second pedestrian at the first moment, wherein the movement track contains the position information of the second pedestrian. The deviation of the two positions at the first moment can be calculated to determine whether it is within the preset threshold. That is, the distance between the two positions can be calculated to determine whether the distance between the two is less than or equal to the preset threshold. When the distance is less than or equal to the preset threshold, it can be determined that the first pedestrian and the second pedestrian are both the target pedestrian. Optionally, the calculation of the position information of the first pedestrian and the position information of the second pedestrian needs to be relative to the coordinates in the same coordinate system, for example, both can be the coordinates in the image, or both can be the global coordinates relative to the same coordinate system.

For example, at the N-th moment, assuming that the global coordinate of the first pedestrian determined according to facial recognition technology is $A_i$ ($x1_i$, $y1_i$), and the global coordinate of the second pedestrian determined according to human body detection technology is $B_i$ ($x2_i$, $y2_i$), the distance between $A_i$ point and $B_i$ point is calculated through the equation $|A_i B_i| = \sqrt{(x1_i - x2_i)^2 + (y1_i - y2_i)^2}$. If the distance is less than or equal to the preset threshold, it can be determined that the first pedestrian and the second pedestrian are the same person, that is, the target pedestrian.

For another example, at a plurality of (at least two) moments, such as the (N−1)-th, N-th and (N+1)-th moments, the position information of the first pedestrian and the second pedestrian at the three moments can be determined according to facial recognition technology and human body detection technology, respectively, and the distance between the two at the three moments can be calculated, respectively. If the distance between the two at the three moments is less than or equal to the preset threshold, the first pedestrian and the second pedestrian can be determined to be the same person, that is, the target pedestrian. In this way, the accuracy of determining the target pedestrian can be improved.

In some exemplary embodiments, the position information of the first pedestrian at the N moments is pre-configured in the system. Specifically, when monitoring by facial recognition technology, if the camera 1 is used to monitor the area A, the configured position coordinates of the area A will be extracted from the camera 1, so as to obtain the position information of the first pedestrian at the N moments.

The movement track of the second pedestrian, that is, the position information of the second pedestrian at the N moments, changes in real time. Specifically, when monitoring by human body detection technology, a monocular vision positioning algorithm can be used to convert pixel positions into coordinates, so as to obtain the position information of the second pedestrian at the N moments, and then obtain the movement track of the second pedestrian.

Among them, the monocular vision positioning algorithm is based on the installation position and internal parameters of the surveillance camera to convert the image pixel position of the tracking target (such as the second pedestrian) into the two-dimensional coordinates projected on the ground in the world coordinate system, so as to realize the generation and display of the movement track of the second pedestrian.

In some exemplary embodiments, when the first pedestrian and the second pedestrian are both the target pedestrian, since the movement track of the second pedestrian is determined in step S303, the movement track of the target pedestrian is the movement track of the second pedestrian.

Since the position coordinates of the first pedestrian at the N moments can be combined to form the movement track of the first pedestrian, the tracking data of the first pedestrian may include the movement track of the first pedestrian, wherein the movement track of the first pedestrian includes position information of the first pedestrian at the N moments.

Since the identity information of the first pedestrian is determined in step S302, and the movement track of the second pedestrian is determined in step S303, and the first pedestrian and the second pedestrian are the target pedestrian, it can be obtained that the determined identity information of the first pedestrian is the identity information of the target pedestrian, the determined movement track of the second pedestrian is the movement track of the target pedestrian. In this way, the movement track of the target pedestrian can be determined according to the movement track of the second pedestrian, and the identity information of the first pedestrian is used as the identity information of the target pedestrian, so the tracking data of the target pedestrian is obtained; that is, a mapping relationship (also referred to as a correspondence relationship) between the movement track of the target pedestrian and the identity information of the target pedestrian is established. When the human body is partially obscured, or the human body pose changes greatly, and so on, since the mapping relationship between the target pedestrian's movement track and identity information is established, therefore, as long as the pedestrian's face is not completely obscured and the identity information of the pedestrian can be identified, the movement tracks of the two pedestrians before and after the above situation can be matched with the identity information of the same first pedestrian, thereby reducing the probability of target tracking loss when the human body detection method is used for pedestrian tracking.

Figure 8:
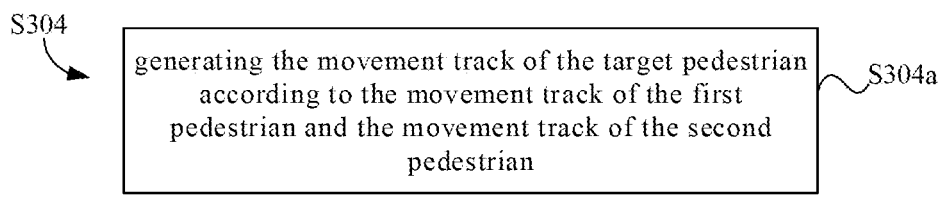
FIG. 8 illustrates the steps in the pedestrian tracking method shown in FIG. 3 in more detail.

Referring to FIG. 8, it further illustrates step S304 in detail. As shown in FIG. 8, in some exemplary embodiments, the above-mentioned step S304 can be implemented by step S304a.

Step S304a: generating the movement track of the target pedestrian according to the movement track of the first pedestrian and the movement track of the second pedestrian.

Figure 9:
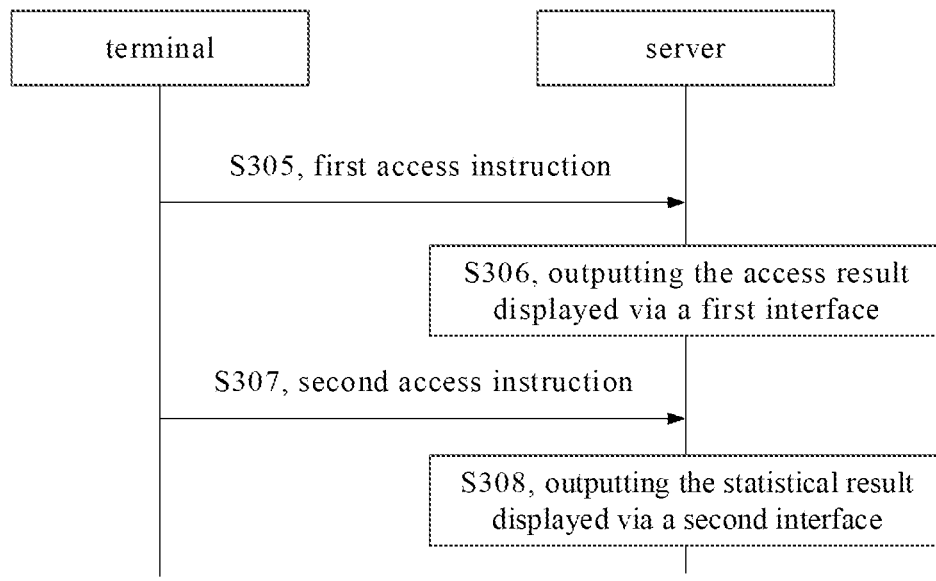
FIG. 9 is a schematic flowchart of another pedestrian tracking method provided according to some exemplary embodiments of the present disclosure.

As shown in FIG. 9, the pedestrian tracking method provided according to the exemplary embodiments of the present disclosure may further include the following steps S305 and S306.

Step S305: receiving a first access instruction.

In step S305, the above-mentioned first access instruction is configured to access the tracking data of the target pedestrian.

Step S306: outputting the access result displayed via a first interface.

In this exemplary embodiment, a user interaction interface is displayed on the terminal, and the user interface may be presented by a browser or an application installed on the terminal. For example, the user may click the view button displayed on the user interaction interface to trigger the terminal to send a request to the server to access the tracking data of the target pedestrian.

In some exemplary embodiments, the server may directly output the access result. For example, after obtaining the access result, the server may output the obtained access result through an output apparatus (such as a display screen) included in the server.

In step 306, the above-mentioned access result includes: the identity information of the target pedestrian and the movement track of the target pedestrian.

Figure 10:
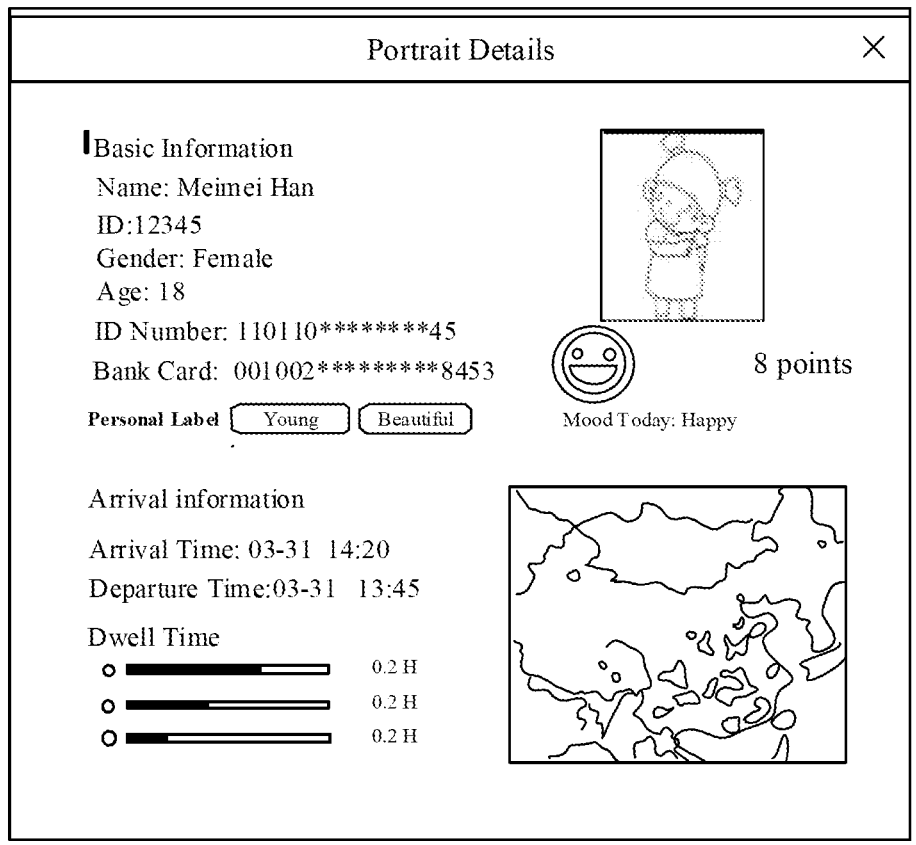
FIG. 10 is a schematic access result interface diagram provided according to some exemplary embodiments of the present disclosure.

In other exemplary embodiments, as shown in FIG. 10, the server may output the first interface and transmit the first interface to the terminal, so that the first interface is displayed on the display screen of the terminal, wherein the first interface can be configured to display the access result.

In some exemplary embodiments, after the movement track of the target pedestrian is determined, the distribution area of the target pedestrian and the dwell time of the target pedestrian in the distribution area can be obtained according to the movement track of the target pedestrian, so that not only the identity information of the target pedestrian and the movement track of the target pedestrian can be displayed on the display screen of the terminal, but also the distribution area of the target pedestrian and the dwell time of the target pedestrian in the distribution area can be displayed.

In other exemplary embodiments, the image of the target pedestrian is extracted from at least some first images in the first video data, or the image of the target pedestrian is extracted from at least some second images in the second video data, so that not only the identity information of the target pedestrian and the movement track of the target pedestrian can be displayed on the display screen of the terminal, but also the image of the target pedestrian can be displayed.

In still other exemplary embodiments, the image of the target pedestrian is extracted from at least some first images in the first video data, and the image of the target pedestrian is extracted from at least some second images in the second video data, so that not only the identity information of the target pedestrian and the movement track of the target pedestrian can be displayed on the display screen of the terminal, but also the image of the target pedestrian can be displayed.

As shown in FIG. 9, the pedestrian tracking method provided by this exemplary embodiment can further include the following steps S307 and S308.

Step S307: receiving a second access instruction.

In step S307, the above-mentioned second access instruction is configured to access a statistical result.

Step S308: outputting the statistical result displayed via a second interface.

In step S308, the above-mentioned statistical result includes at least one of first data, second data, third data, and fourth data. The second interface is configured to display the statistical result.

Figure 11:
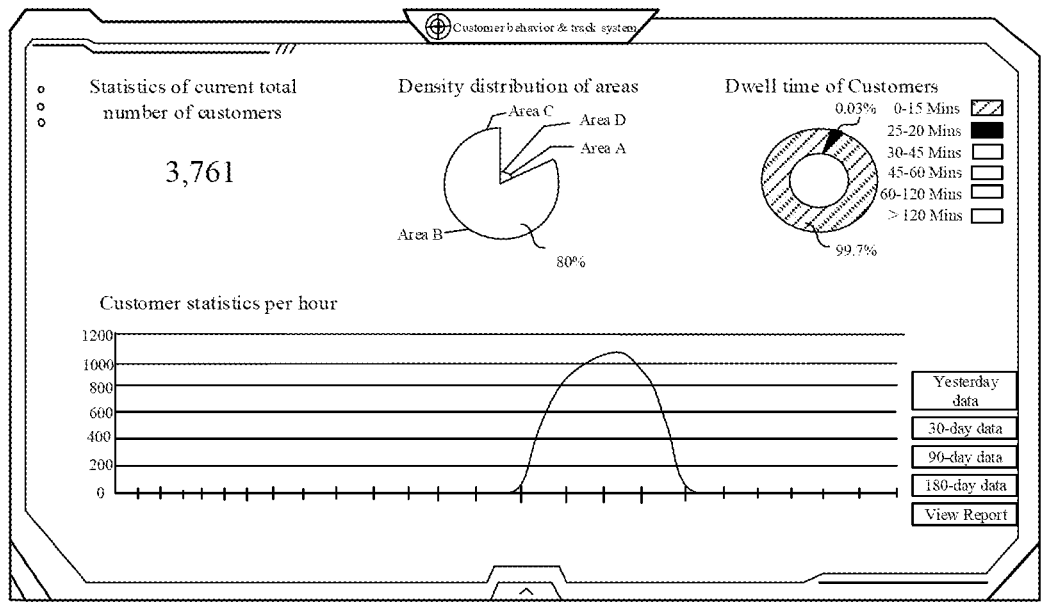
FIG. 11 is a schematic statistical result interface diagram provided according to some exemplary embodiments of the present disclosure.

The first data is a total number of target pedestrians in at least one distribution area at a current time. As shown in FIG. 11, at the current time, there are a total of 3761 persons in area A, area B, area C, and area D.

The second data is a first number or a first ratio of the target pedestrians whose dwell time in the at least one distribution area is in different preset time intervals at the current time, the first ratio being a ratio of the first number to the total number of the target pedestrians. As shown in FIG. 11, taking the preset time of 15 minutes as an example, within 0-15 minutes, the first ratio of staying in the area A, the area B, the area C, and the area D is 99.97%.

The third data is a second number or a second ratio of the target pedestrians in each distribution area in a time period when the at least one distribution area comprises a plurality of distribution areas, the second ratio being a ratio of the second number to the total number of the target pedestrians. As shown in FIG. 11, in the case of four areas, that is, the area A, the area. B, the area C, and the area D, taking the preset time of 15 minutes as an example, within 0-15 minutes, the second ration of the number of people staying in the area B relative to the total number of people is 80%.

The fourth data is a total number of the target pedestrians in the at least one distribution area at different moments in a historical time period. Taking the historical time period of the past 24 hours as an example, as shown in FIG. 11, the total number of people at each moment in the past 24 hours is shown.

In some exemplary embodiments, data statistics may be performed based on the movement track of each target pedestrian in at least one distribution area to obtain the statistics result.

It should be noted that, in the exemplary embodiment, the pedestrian tracking methods shown in the above various figures are all exemplified in combination with one figure in this embodiment. In a specific implementation, the pedestrian tracking methods shown in the above various figures can also be implemented in combination with any other figures illustrated in the above embodiments that can be combined, which will not be repeatedly described here.

Figure 12:
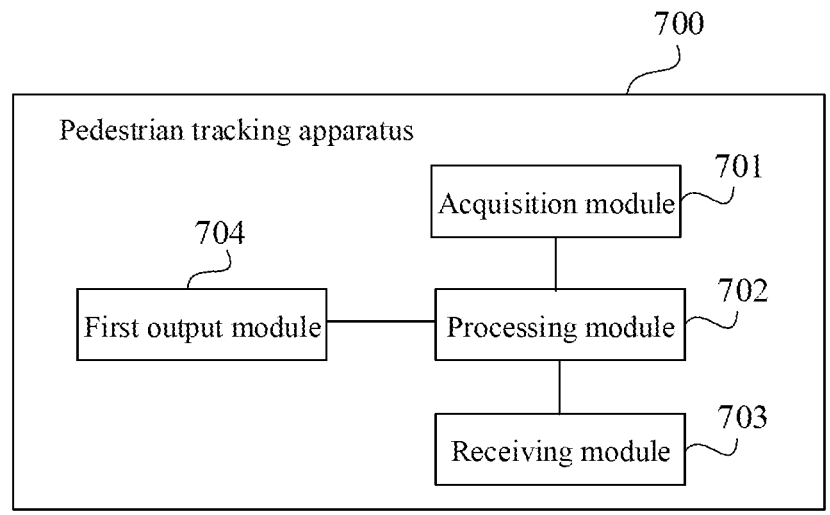
FIG. 12 is a schematic structural diagram of a pedestrian tracking apparatus provided according to some exemplary embodiments of the present disclosure.

As shown in FIG. 12, a pedestrian tracking apparatus is provided according to an exemplary embodiment of the present disclosure. The pedestrian tracking apparatus 700 may include an acquisition module 701 and a processing module 702. The acquisition module 701 can be configured to acquire at least one piece of first video data and at least one piece of second video data, each piece of first video data includes a plurality of frames of first image, and each piece of second video data includes a plurality of frames of second image. The processing module 702 can be configured to perform facial recognition on at least some first images of the plurality of frames of first image acquired by the acquiring module 701 to obtain the tracking data of the first pedestrian. The tracking data of the first pedestrian includes: the identity information of the pedestrian and the position information of the first pedestrian at N moments; N is an integer greater than or equal to 1. The processing module 702 is further configured to perform human body detection on at least some second images of the plurality of frames of second image acquired by the acquiring module 701 to obtain tracking data of the second pedestrian. The tracking data of the second pedestrian includes the movement track of the second pedestrian, and the movement track of the second pedestrian includes position information of the second pedestrian at a plurality of moments. The processing module 702 is further configured to determine tracking data of a target pedestrian when deviation between the position information of the first pedestrian at the N moments and the position information of the movement track of the second pedestrian at the same moments is within a preset range. The tracking data of the target pedestrian includes identity information of the target pedestrian and a movement track of the target pedestrian, and wherein the first pedestrian and the second pedestrian are both the target pedestrian. The identity information of the target pedestrian is determined according to the identity information of the first pedestrian, and the movement track of the target pedestrian is determined at least according to the movement track of the second pedestrian.

In some exemplary embodiments, the processing module 702 can be specifically configured as: detecting whether each first image in the at least some first images includes a face of the first pedestrian; when the face of the first pedestrian is detected, acquiring facial feature information of the first pedestrian, and matching the facial feature information of the first pedestrian with facial feature information in a face database, wherein the face database includes a plurality of pieces of facial feature information and identity information of pedestrians respectively corresponding to the plurality of pieces of facial feature information; if successfully matched, using identity information of a pedestrian in the face database that matches the facial feature information of the first pedestrian as the identity information of the first pedestrian; if unsuccessfully matched, recording the facial feature information of the first pedestrian.

In some exemplary embodiments, the processing module 702 can be specifically configured as: acquiring pedestrian frames in each second image of the at least some second images of the plurality of frames of second image, and obtaining the tracking data of the second pedestrian based on various pedestrian frames acquired, wherein a pedestrian frame is a frame shape marked according to a human body detected in each second image.

In some exemplary embodiments, the processing module 702 can be specifically configured as: processing image blocks corresponding to the various pedestrian frames by using a trained neural network model to obtain feature vectors of the image blocks corresponding to the various pedestrian frames; determining a pedestrian track of at least one pedestrian based on a feature vector of each of the various pedestrian frames, using the pedestrian track of the at least one pedestrian as the tracking data of the second pedestrian, wherein each of the at least one pedestrian corresponds to a pedestrian track.

In some exemplary embodiments, the processing module 702 can be specifically configured as: calculating a distance between a global coordinate of the first pedestrian and a global coordinate of the second pedestrian at each of the N moments, respectively, via the following equation $|A_iB_i| = \sqrt{(x1_i - x2_i)^2 + (y1_i - y2_i)^2}$, wherein, for each of the N moments, if the distance between the global coordinate $A_i$ of the first pedestrian and the global coordinate $B_i$ of the second pedestrian is less than or equal to a preset threshold, the first pedestrian and the second pedestrian are both determined as the target pedestrian, wherein, at an i-th moment, the global coordinate of the first pedestrian is $A_i$ ($x1_i$, $y1_i$) and the global coordinate of the second pedestrian is $B_i$ ($x2_i$, $y2_i$), position information comprises global coordinates, and the global coordinates are coordinates of pedestrians in a global coordinate system.

In some exemplary embodiments, the movement track of the target pedestrian is the movement track of the second pedestrian. Alternatively, the tracking data of the first pedestrian includes: the identity information of the first pedestrian and the movement track of the first pedestrian. The movement track of the first pedestrian includes the position information of the first pedestrian at the N moments. The processing module can be specifically configured to generate the movement track of the target pedestrian according to the movement track of the first pedestrian and the movement track of the second pedestrian.

In some exemplary embodiments, as shown in FIG. 12, the pedestrian tracking apparatus 700 provided by the exemplary embodiments further includes a receiving module 703. The receiving module 703 can be configured to receive the first video data from a first camera device and receive the second video data from a second camera device, wherein the first camera device is different from the second camera device. Alternatively, the receiving module 703 is configured to receive the first video data and the second video data from a third camera device. In some exemplary embodiments, as shown in FIG. 12, the pedestrian tracking apparatus provided by the exemplary embodiments further includes a first output module 704. The receiving module 703 can also be configured to receive a first access instruction configured to access the tracking data of the target pedestrian. The first output module 704 can be configured to output an access result displayed via a first interface. The access result may include: the identity information of the target pedestrian and the movement track of the target pedestrian.

In some exemplary embodiments, the processing module 702 can be further configured to acquire the distribution area of the target pedestrian and the dwell time of the target pedestrian in the distribution area according to the movement track of the target pedestrian; and/or, the processing module 702 can be further configured to extract an image of the target pedestrian from at least some first images of the plurality of frames of first image; and/or, the processing module 702 can be further configured to extract an image of the target pedestrian from at least some second images of the plurality of frames of second image; in the case that the pedestrian tracking method includes outputting the access result or the first interface, the access result also includes at least one of the image of the target pedestrian, the distribution area of the target pedestrian, and the dwell time of the target pedestrian in the distribution area.

In some exemplary embodiments, the pedestrian tracking apparatus 700 provided by the exemplary embodiments further includes a second output module. The receiving module is further configured to receive a second access instruction, and the second access instruction is configured to access a statistical result. The second output module is configured to output a statistical result displayed through a second interface. The statistical result includes: at least one of first data, second data, third data and fourth data; wherein the first data may be a total number of target pedestrians in at least one distribution area at a current time; the second data may be a first number or a first ratio of the target pedestrians whose dwell time in the at least one distribution area is in different preset time intervals at the current time, the first ratio being a ratio of the first number to the total number of the target pedestrians; the third data may be a second number or a second ratio of the target pedestrians in each distribution area in a time period when the at least one distribution area includes a plurality of distribution areas, the second ratio being a ratio of the second number to the total number of the target pedestrians; the fourth data may be a total number of the target pedestrians in the at least one distribution area at different moments in a historical time period.

It should be understood that all the modules described above with respect to FIG. 12 may be implemented in hardware or in hardware combined with software and/or firmware. For example, these modules may be implemented as computer-executable codes/instructions configured to be executed in one or more processors and stored in a computer-readable storage medium. Alternatively, these modules can be implemented as hardware logic/circuitry. For example, in some exemplary embodiments, one or more of these modules may be implemented together in a system on chip (SoC). The SoC may include an integrated circuit chip (which includes a processor (for example, a central processing unit (CPU), a microcontroller, a microprocessor, a digital signal processor (DSP), and the like), a memory, one or more communication interfaces, and/or one or more components in other circuits), and can optionally execute the received program code and/or include embedded firmware to perform functions.

Referring back to FIG. 1, it schematically shows a possible system architecture 100 provided according to an exemplary embodiment of the present disclosure, which may be used to implement the pedestrian tracking methods according to the exemplary embodiments of the present disclosure. The system architecture 100 includes: at least one (one or more) image acquisition device 110, a server 120, and a terminal 130. The server 120 may use the hardware structure shown in FIG. 2. As shown in FIG. 2, the server 120 may include at least one processor 201 and a memory 202, and the memory 202 includes an operating system and instructions (for example, computer instructions). It should be noted that the system functions of the system architecture 100 may include functions at the application layer, algorithm layer, basic layer, and user layer.

The algorithm layer can include facial recognition, pedestrian detection, pedestrian tracking, and visual positioning. The facial recognition algorithm uses camera devices to collect video data, and then detects whether there is a face in the collection area. When a face is detected, the feature value information of the face is matched with the facial feature information in the face database. If successfully matched, the specific identity information and position information of the face will be identified; if unsuccessfully matched, the facial information will be recorded and automatically numbered for use in the next identification and matching. Pedestrian detection and pedestrian tracking process the real-time video captured by camera devices into image frames, recognize all pedestrians in the image frames, and draw frames for pedestrians. The trained convolutional neural network is used to process pedestrians in the plurality of frames of image. Perform matching on all pedestrian frames based on the feature vector of each pedestrian frame, record the movement tracks of the pedestrians, and track the pedestrians' tracks. Visual positioning is to convert the image pixel position of the tracking target into two-dimensional coordinates projected on the ground in the world coordinate system according to the installation position and internal parameters of the camera device used for monitoring, so as to form the track of the tracking target.

The application layer can include video stream processing, face position calibration, pedestrian position calibration, and position matching. In the application layer, the video stream processing module may process one piece of video data (for example, the first video data) to generate a plurality of frames of image (for example, the first images). Then, the facial recognition algorithm in the algorithm layer (used to implement the above step S302) processes the generated plurality of frames of image to generate tracking data (such as the identity information) of the pedestrian (such as the first pedestrian) corresponding to the face. The human body detection and tracking algorithm (used to implement the above step S303) included in the algorithm layer processes the generated plurality of frames of image to generate tracking data (such as movement track) of the pedestrian (such as the second pedestrian). In the process of using the human body detection and tracking algorithm to generate the movement track of the second pedestrian, the visual positioning algorithm included in the algorithm layer can be used to convert the pixel positions in the plurality of frames of image into coordinates, so as to obtain the position information of the second pedestrian at the N moments, and then obtain the movement track of the second pedestrian. After obtaining the tracking data of the first pedestrian and the second pedestrian, the application layer can use the above-mentioned method to perform position matching. The basic layer can include databases, stored data, and network components. As a non-limiting example, the database may be a relational database, in which the facial feature information of the faces and the identity information corresponding thereto are stored. The stored data may include the tracking data (such as identity information) of pedestrians (such as the first pedestrian). A network component can be a network interface that connects a server with a terminal or other device.

The user layer can include target identification, target movement track, target staying area, target portrait. After the tracking data of the first pedestrian and the tracking data of the second pedestrian are generated by the algorithm layer, these results can be input to the user layer. After the user layer obtains these results, the user layer can display the results, for example, at least one of the identity information, the movement track, the staying area and the portrait of the first pedestrian.

Those having ordinary skills in the art should understand that a relational database is a database based on a relational model, which includes a plurality of two-dimensional row-column tables that can be connected to each other, and processes data in the database by means of mathematical concepts and methods such as set algebra and the like.

Therefore, according to an exemplary embodiment of the present disclosure, a computing device is provided, which is used to implement the pedestrian tracking methods described in the above-mentioned embodiments. In some exemplary embodiments, the computing device can include a memory and a processor, wherein the memory is used to store computer instructions, and the processor is used to run the computer instructions, so that the server implements the pedestrian tracking methods described in the above-mentioned embodiments. As a non-limiting example, the computing device may be implemented as the server shown in FIG. 2.

In addition, based on the system architecture and server taught by the exemplary embodiments of the present disclosure, the present disclosure also provides a pedestrian tracking system. The pedestrian tracking system may include a memory, a processor, a first camera device, and a second camera device. The memory is used to store computer instructions, the processor is used to run the computer instructions so that the server implements the pedestrian tracking method described in any of the above-mentioned embodiments, the first camera device is used to obtain at least one piece of first video data, and the second camera device uses to obtain at least one piece of second video data.

In addition, according to an exemplary embodiment of the present disclosure, a computer-readable storage medium is also provided, for example, a non-transitory computer-readable storage medium having a computer program stored thereon. The computer program, when executed by the processor, the various processes of the above-mentioned pedestrian tracking method embodiments are realized, and the same technical effect can be achieved, which is not repeatedly described here in order to avoid repetition. The computer-readable storage medium may include read-only memory (ROM), random access memory (RAM), erasable programmable read-only memory (EPROM) or flash memory, optical fiber device, magnetic disk or optical disk, and so on. In addition, the computer-readable storage medium can even be paper or other suitable media on which the program can be printed. This is because the computer program can be obtained electronically and stored in the computer memory, for example, by optically scanning the paper or other media, and then editing, interpreting or processing in other suitable manners if necessary.

It should be understood that the above exemplary embodiments are only used to illustrate the technical solutions of the present disclosure, but not to limit them. In addition, although the present disclosure is described in detail with reference to the foregoing exemplary embodiments, those having ordinary skills in the art should understand that the technical solutions described in the foregoing exemplary embodiments can still be modified, or some the technical features can be equivalently replaced; however, these modifications or replacements do not make the essence of the corresponding technical solutions deviate from the spirit and scope of the technical solutions of the exemplary embodiments of the present disclosure. The scope of the present disclosure is defined by the appended claims.

What is claimed is:

1. A pedestrian tracking method, comprising the following steps:
   acquiring at least one piece of first video data and at least one piece of second video data, wherein each piece of first video data comprises a plurality of frames of first image, and each piece of second video data comprises a plurality of frames of second image;
   performing facial recognition on at least some first images of the plurality of frames of first image to obtain tracking data of a first pedestrian, wherein the tracking data of the first pedestrian comprises identity information of the first pedestrian and position information of the first pedestrian at N moments, and N is an integer greater than or equal to 1;
   performing human body detection on at least some second images of the plurality of frames of second image to obtain tracking data of a second pedestrian, wherein the tracking data of the second pedestrian comprises a movement track of the second pedestrian, and the movement track of the second pedestrian comprises position information of the second pedestrian at a plurality of moments;

determining tracking data of a target pedestrian when deviation between the position information of the first pedestrian at the N moments and the position information of the movement track of the second pedestrian at the same moments is within a preset range, wherein the tracking data of the target pedestrian comprises identity information of the target pedestrian and a movement track of the target pedestrian, and wherein the first pedestrian and the second pedestrian are both the target pedestrian, and the identity information of the target pedestrian is determined at least according to the identity information of the first pedestrian, and the movement track of the target pedestrian is determined at least according to the movement track of the second pedestrian.

2. The pedestrian tracking method according to claim 1, wherein the step of performing facial recognition on at least some first images of the plurality of frames of first image to obtain tracking data of a first pedestrian comprises:

detecting whether each first image in the at least some first images comprises a face of the first pedestrian;

when the face of the first pedestrian is detected, acquiring facial feature information of the first pedestrian, and matching the facial feature information of the first pedestrian with facial feature information in a face database, wherein the face database comprises a plurality of pieces of facial feature information and identity information of pedestrians respectively corresponding to the plurality of pieces of facial feature information;

if successfully matched, using identity information of a pedestrian in the face database that matches the facial feature information of the first pedestrian as the identity information of the first pedestrian;

if unsuccessfully matched, recording the facial feature information of the first pedestrian.

3. The pedestrian tracking method according to claim 1, wherein the step of performing human body detection on at least some second images of the plurality of frames of second image to obtain tracking data of a second pedestrian comprises:

acquiring pedestrian frames in each second image of the at least some second images of the plurality of frames of second image, and obtaining the tracking data of the second pedestrian based on various pedestrian frames acquired, wherein a pedestrian frame is a frame shape marked according to a human body detected in each second image.

4. The pedestrian tracking method according to claim 3, wherein the step of obtaining the tracking data of the second pedestrian based on various pedestrian frames acquired comprises:

processing image blocks corresponding to the various pedestrian frames by using a trained neural network model to obtain feature vectors of the image blocks corresponding to the various pedestrian frames;

determining a pedestrian track of at least one pedestrian based on a feature vector of each of the various pedestrian frames, using the pedestrian track of the at least one pedestrian as the tracking data of the second pedestrian, wherein each of the at least one pedestrian corresponds to a pedestrian track.

5. The pedestrian tracking method according to claim 1, wherein the step of determining tracking data of a target pedestrian when deviation between the position information of the first pedestrian at N moments and the position information of the movement track of the second pedestrian at the same moments is within a preset range comprises:

calculating a distance between a global coordinate of the first pedestrian and a global coordinate of the second pedestrian at each of the N moments, respectively, via the following equation:

$$|A_i B_i| = \sqrt{(x1_i - x2_i)^2 + (y1_i - y2_i)^2},$$

wherein, for each of the N moments, if the distance between the global coordinate $A_i$ of the first pedestrian and the global coordinate $B_i$ of the second pedestrian is less than or equal to a preset threshold, the first pedestrian and the second pedestrian are both determined as the target pedestrian, wherein, at an i-th moment, the global coordinate of the first pedestrian is $A_i$ ($x1_i$, $y1_i$) and the global coordinate of the second pedestrian is $B_i$ ($x2_i$, $y2_i$), $1 \leq i \leq N$; position information comprises global coordinates, and the global coordinates are coordinates of pedestrians in a global coordinate system.

6. The pedestrian tracking method according to claim 1, wherein the step that the movement track of the target pedestrian is determined at least according to the movement track of the second pedestrian comprises:

determining the movement track of the second pedestrian as the movement track of the target pedestrian; or generating the movement track of the target pedestrian based on the position information of the first pedestrian at the N moments and the movement track of the second pedestrian.

7. The pedestrian tracking method according to claim 1, further comprising:

receiving the first video data from a first camera device and receiving the second video data from a second camera device, wherein the first camera device is different from the second camera device; or receiving the first video data and the second video data from a third camera device.

8. The pedestrian tracking method according to claim 1, further comprising:

receiving a first access instruction configured to access the tracking data of the target pedestrian;

outputting an access result displayed via a first interface, wherein the access result comprises the identity information of the target pedestrian and the movement track of the target pedestrian.

9. The pedestrian tracking method according to claim 1, further comprising:

acquiring a distribution area of the target pedestrian and a dwell time of the target pedestrian in the distribution area, based on the movement track of the target pedestrian;

extracting an image of the target pedestrian from the at least some first images of the plurality of frames of first image;

extracting an image of the target pedestrian from the at least some second images of the plurality of frames of second image, wherein, when the pedestrian tracking method comprises outputting an access result, the access result further comprises at least one of: the image of the target pedestrian, the distribution area of the target pedestrian and the dwell time of the target pedestrian in the distribution area.

10. The pedestrian tracking method according to claim 9, further comprising:
receiving a second access instruction configured to access a statistical result;
outputting the statistical result displayed via a second interface, the statistical result comprising at least one of: first data, second data, third data and fourth data,
wherein the first data is a total number of target pedestrians in at least one distribution area at a current time,
wherein the second data is a first number or a first ratio of the target pedestrians whose dwell time in the at least one distribution area is in different preset time intervals at the current time, the first ratio being a ratio of the first number to the total number of the target pedestrians,
wherein the third data is a second number or a second ratio of the target pedestrians in each distribution area in a time period when the at least one distribution area comprises a plurality of distribution areas, the second ratio being a ratio of the second number to the total number of the target pedestrians,
wherein the fourth data is a total number of the target pedestrians in the at least one distribution area at different moments in a historical time period.

11. A computing device, comprising a memory and a processor, wherein the memory is configured to store computer instructions, and the processor is configured to run the computer instructions, wherein the computer instructions, when run by the processor, implement the pedestrian tracking method according to claim 1.

12. The computing device according to claim 11, wherein the step of performing facial recognition on at least some first images of the plurality of frames of first image to obtain tracking data of a first pedestrian comprises:
detecting whether each first image of the at least some first images comprises a face of the first pedestrian;
when the face of the first pedestrian is detected, acquiring facial feature information of the first pedestrian, and matching the facial feature information of the first pedestrian with facial feature information in a face database, wherein the face database comprises a plurality of pieces of facial feature information and identity information of pedestrians respectively corresponding to the plurality of pieces of facial feature information;
if successfully matched, using identity information of a pedestrian in the face database that matches the facial feature information of the first pedestrian as the identity information of the first pedestrian;
if unsuccessfully matched, recording the facial feature information of the first pedestrian.

13. The computing device according to claim 11, wherein the step of performing human body detection on at least some second images of the plurality of frames of second image to obtain tracking data of a second pedestrian comprises:
acquiring pedestrian frames in each second image of the at least some second images of the plurality of frames of second image, and obtaining the tracking data of the second pedestrian based on various pedestrian frames acquired, wherein a pedestrian frame is a frame shape marked according to a human body detected in each second image.

14. The computing device according to claim 11, wherein the step of determining tracking data of a target pedestrian when deviation between the position information of the first pedestrian at N moments and the position information of the movement track of the second pedestrian at the same moments is within a preset range comprises:
calculating a distance between a global coordinate of the first pedestrian and a global coordinate of the second pedestrian at each of the N moments, respectively, via the following equation:

$$|A_i B_i| = \sqrt{(x1_i - x2_i)^2 + (y1_i - y2_i)^2},$$

wherein, for each of the N moments, if the distance between the global coordinate $A_i$ of the first pedestrian and the global coordinate $B_i$ of the second pedestrian is less than or equal to a preset threshold, the first pedestrian and the second pedestrian are both determined as the target pedestrian,
wherein, at an i-th moment, the global coordinate of the first pedestrian is $A_i$ ($x1_i$, $y1_i$) and the global coordinate of the second pedestrian is $B_i$ ($x2_i$, $y2_i$), $1 \leq i \leq N$; position information comprises global coordinates, and the global coordinates are coordinates of pedestrians in a global coordinate system.

15. A pedestrian tracking system comprising: a first camera device, a second camera device, a computing device, wherein the first camera device is configured to acquire at least one piece of first video data, the second camera device is configured to acquire at least one piece of second video data, the computing device comprises a memory and a processor, the memory is configured to store computer instructions and the processor is configured to run the computer instructions, wherein the computer instructions, when run by the processor, implement the pedestrian tracking method according to claim 1.

16. The pedestrian tracking system according to claim 15, further comprising a routing apparatus configured to connect the first camera device, the second camera device and the computing device.

17. A non-transitory computer readable storage medium configured to store computer instructions, wherein the computer instructions, when run by a processor, implement the pedestrian tracking method according to claim 1.

18. The non-transitory computer readable storage medium according to claim 17, wherein the step of performing facial recognition on at least some first images of the plurality of frames of first image to obtain tracking data of a first pedestrian comprises:
detecting whether each first image in the at least some first images comprises a face of the first pedestrian;
when the face of the first pedestrian is detected, acquiring facial feature information of the first pedestrian, and matching the facial feature information of the first pedestrian with facial feature information in a face database, wherein the face database comprises a plurality of pieces of facial feature information and identity information of pedestrians respectively corresponding to the plurality of pieces of facial feature information;
if successfully matched, using identity information of a pedestrian in the face database that matches the facial feature information of the first pedestrian as the identity information of the first pedestrian;

if unsuccessfully matched, recording the facial feature information of the first pedestrian.

19. The non-transitory computer readable storage medium according to claim 17, wherein the step of performing human body detection on at least some second images of the plurality of frames of second image to obtain tracking data of a second pedestrian comprises:

acquiring pedestrian frames in each second image of the at least some second images of the plurality of frames of second image, and obtaining the tracking data of the second pedestrian based on various pedestrian frames acquired, wherein a pedestrian frame is a frame shape marked according to a human body detected in each second image.

20. The non-transitory computer readable storage medium according to claim 17, wherein the step of determining tracking data of a target pedestrian when deviation between the position information of the first pedestrian at N moments and the position information of the movement track of the second pedestrian at the same moments is within a preset range comprises:

calculating a distance between a global coordinate of the first pedestrian and a global coordinate of the second pedestrian at each of the N moments, respectively, via the following equation:

$$|A_i B_i| = \sqrt{(x1_i - x2_i)^2 + (y1_i - y2_i)^2},$$

wherein, for each of the N moments, if the distance between the global coordinate $A_i$ of the first pedestrian and the global coordinate $B_i$ of the second pedestrian is less than or equal to a preset threshold, the first pedestrian and the second pedestrian are both determined as the target pedestrian, wherein, at an i-th moment, the global coordinate of the first pedestrian is $A_i$ ($x1_i$, $y1_i$) and the global coordinate of the second pedestrian is $B_i$ ($x2_i$, $y2_i$), $1 \leq i \leq N$; position information comprises global coordinates, and the global coordinates are coordinates of pedestrians in a global coordinate system.

* * * * *